United States Patent
Ghadiok et al.

(10) Patent No.: US 11,164,014 B1
(45) Date of Patent: Nov. 2, 2021

(54) LANE VIOLATION DETECTION USING CONVOLUTIONAL NEURAL NETWORKS

(71) Applicant: Hayden AI Technologies, Inc., Oakland, CA (US)

(72) Inventors: Vaibhav Ghadiok, Mountain View, CA (US); Christopher Carson, Oakland, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

(21) Appl. No.: 17/242,969

(22) Filed: Apr. 28, 2021

Related U.S. Application Data

(60) Provisional application No. 63/111,290, filed on Nov. 9, 2020.

(51) Int. Cl.
| | |
|---|---|
| *G06K 9/00* | (2006.01) |
| *G06K 9/32* | (2006.01) |
| *G06K 9/46* | (2006.01) |
| *G06K 9/44* | (2006.01) |
| *G06N 3/08* | (2006.01) |
| *G06K 9/40* | (2006.01) |

(52) U.S. Cl.
CPC ....... *G06K 9/00798* (2013.01); *G06K 9/3233* (2013.01); *G06K 9/40* (2013.01); *G06K 9/44* (2013.01); *G06K 9/4647* (2013.01); *G06N 3/08* (2013.01); *G06K 2209/23* (2013.01)

(58) Field of Classification Search
CPC .... G06K 9/00798; G06K 9/4647; G06K 9/40; G06K 9/44; G06K 9/3233; G06K 2209/23; G06N 3/08
See application file for complete search history.

(56) References Cited

U.S. PATENT DOCUMENTS

| | | | | |
|---|---|---|---|---|
| 2014/0036076 | A1* | 2/2014 | Nerayoff | G06K 9/00791 |
| | | | | 348/148 |
| 2014/0311456 | A1* | 10/2014 | Richter | F02D 41/3845 |
| | | | | 123/476 |
| 2021/0209941 | A1* | 7/2021 | Tremaine | H02B 1/30 |
| 2021/0237737 | A1* | 8/2021 | Al-Nuaimi | G08G 1/167 |
| 2021/0241003 | A1* | 8/2021 | Seo | G06K 9/00798 |

OTHER PUBLICATIONS

Mikel Canizo, "Multi-Head CNN-RNN for multi time series anomaly detection: An industrial case study" (hereafter Mikel). (Year: 2019).*

* cited by examiner

*Primary Examiner* — Dhaval V Patel
(74) *Attorney, Agent, or Firm* — Levine Bagade Han LLP

(57) ABSTRACT

Disclosed herein are systems, methods, and devices for detecting traffic lane violations. In one embodiment, a method for detecting a potential traffic violation is disclosed comprising bounding a vehicle detected from one or more video frames of a video in a vehicle bounding box. The vehicle can be detected and bounded using a first convolutional neural network. The method can also comprise bounding, using the one or more processors of the edge device, a plurality of lanes of a roadway detected from the one or more video frames in a plurality of polygons. The plurality of lanes can be detected and bounded using multiple heads of a multi-headed second convolutional neural network. The method can further comprise detecting a potential traffic violation based in part on an overlap of at least part of the vehicle bounding box and at least part of one of the polygons.

26 Claims, 16 Drawing Sheets

CARRIER VEHICLE 110

MUNICIPAL FLEET VEHICLE

SEMI-AUTONOMOUS VEHICLE

AUTONOMOUS VEHICLE

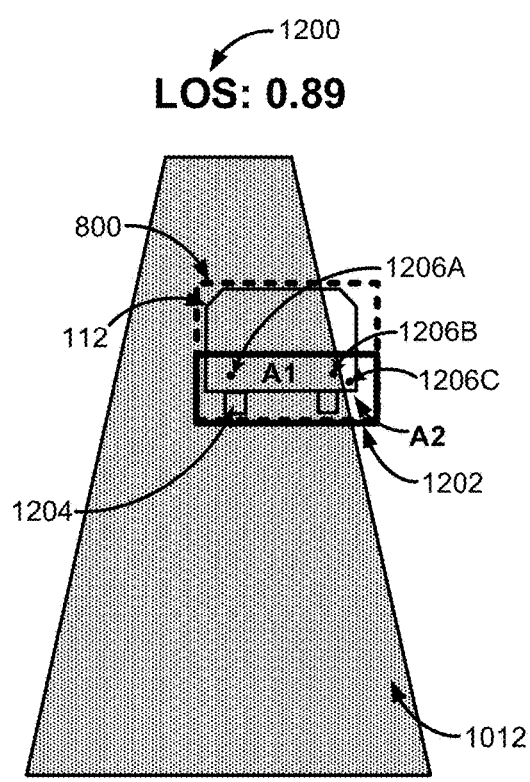
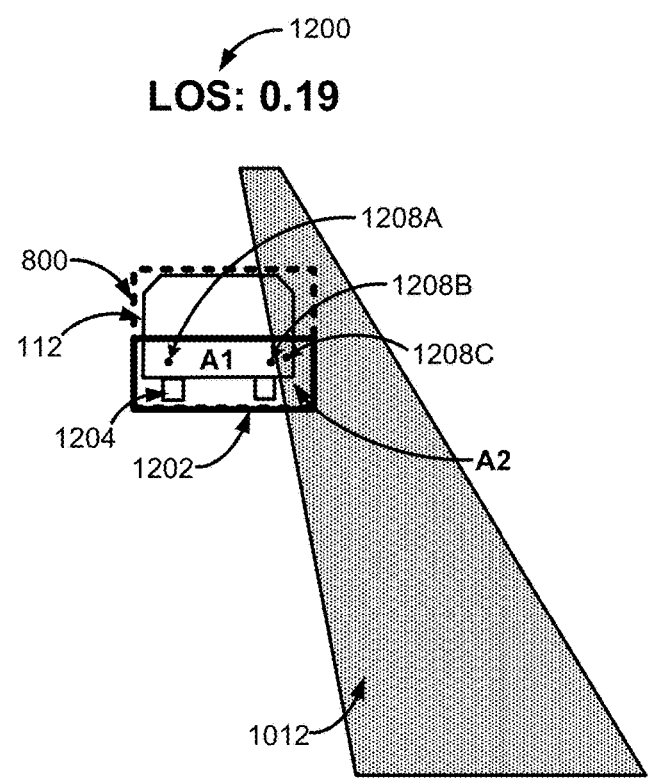
FIG. 12A
FIG. 12B

LANE VIOLATION DETECTION USING CONVOLUTIONAL NEURAL NETWORKS

CROSS-REFERENCE TO RELATED APPLICATION

This application claims the benefit of U.S. Provisional Patent Application No. 63/111,290 filed on Nov. 9, 2020, the content of which is incorporated herein by reference in its entirety.

TECHNICAL FIELD

This disclosure relates generally to the field of computer-based traffic violation detection, more specifically, to systems and methods for detecting traffic lane violations using convolutional neural networks.

BACKGROUND

Non-public vehicles parking in bus lanes or bike lanes is a significant transportation problem for municipalities, counties, and other government entities. While some cities have put in place Clear Lane Initiatives aimed at improving bus speeds, enforcement of bus lane violations is often lacking and the reliability of multiple buses can be affected by just one vehicle illegally parked or temporarily stopped in a bus lane. Such disruptions in bus schedules can frustrate those that depend on public transportation and result in decreased ridership. On the contrary, as buses speed up due to bus lanes remaining unobstructed, reliability improves, leading to increased ridership, less congestion on city streets, and less pollution overall.

Similarly, vehicles parked illegally in bike lanes can force bicyclists to ride on the road, making their rides more dangerous and discouraging the use of bicycles as a safe and reliable mode of transportation. Moreover, vehicles parked along curbs or lanes designated as no parking zones or during times when parking is forbidden can disrupt crucial municipal services such as street sweeping, waste collection, and firefighting operations.

Traditional traffic enforcement technology and approaches are often not suited for lane enforcement purposes. For example, most traffic enforcement cameras are set up near crosswalks or intersections and are not suitable for enforcing lane violations beyond the cameras' fixed field of view. While some municipalities have deployed automated camera-based solutions to enforce traffic violations beyond intersections and cross-walks, such solutions are often logic-based and can result in detections with up to 80% false positive detection rate. Moreover, municipalities often do not have the financial means to dedicate specialized personnel to enforce lane violations.

Furthermore, lane detection, in particular, is challenging because models trained for recognizing objects such as vehicles, pedestrians, or traffic lights are often not suitable for detecting lanes on a roadway. Moreover, almost all roadways have multiple lanes and traditional traffic enforcement tools often have difficulty distinguishing between such lanes.

Therefore, an improved traffic violation detection system is needed which addresses the challenges faced by traditional traffic enforcement systems and approaches. Such a solution should be accurate and use resources currently available to a municipality or other government entity. Moreover, such a solution should improve traffic safety and enable transportation efficiency. Furthermore, such a solution should be scalable and reliable and not be overly expensive to deploy.

SUMMARY

Disclosed herein are systems, methods, and devices for detecting traffic lane violations using convolutional neural networks. In one embodiment, a method for detecting a potential traffic violation is disclosed comprising bounding, using one or more processors of an edge device, a vehicle detected from one or more video frames of a video in a vehicle bounding box. The video can be captured by one or more video image sensors of the edge device. The vehicle can be detected and bounded using a first convolutional neural network.

The method can further comprise bounding, using the one or more processors of the edge device, a plurality of lanes of a roadway detected from the one or more video frames in a plurality of polygons. The plurality of lanes can be detected and bounded using multiple heads of a multi-headed second convolutional neural network separate from the first convolutional neural network, and wherein at least one of the polygons is a lane-of-interest (LOI) polygon bounding an LOI. The method can further comprise detecting, using the one or more processors, a potential traffic violation based in part on an overlap of at least part of the vehicle bounding box and at least part of the LOI polygon. In certain embodiments, the method can also comprise applying a noise smoothing operation to the one or more video frames comprising the plurality of lanes prior to bounding the plurality of lanes using the polygons.

In some embodiments, detecting the potential traffic violation can further comprise the steps of discarding an upper portion of the vehicle bounding box such that only a lower portion of the vehicle bounding box remains, masking the LOI polygon by filling an area within the LOI polygon with pixels, determining a pixel intensity value associated with each pixel within the lower portion of the vehicle bounding box, calculating a lane occupancy score by taking an average of the pixel intensity values of all pixels within the lower portion of the vehicle bounding box, and detecting the potential traffic violation when the lane occupancy score exceeds a predetermined threshold value. The pixel intensity value can represent a degree of overlap between the LOI polygon and the lower portion of the vehicle bounding box.

The method can further comprise transmitting outputs from a first convolutional neural network comprising data or information concerning the vehicle bounding box from the first worker to a third worker of the event detection engine using an inter-process communication protocol. In one embodiments, the inter-process communication protocol can be user datagram protocol (UDP) sockets. The first convolutional neural network can be run by a first worker of an event detection engine on the edge device. The method can also comprise transmitting outputs from a second convolutional neural network comprising data or information concerning the plurality of polygons and the LOI polygon from the second worker to the third worker using the inter-process communication protocol. The second convolutional neural network can be run by a second worker of the event detection engine. The method can comprise detecting the potential traffic violation using the third worker based on data and information received via the inter-process communication protocol from the first worker and the second worker.

In some embodiments, the method can comprise cropping and resizing the one or more video frames prior to bounding the vehicle in the vehicle bounding box and cropping and resizing the one or more video frames prior to bounding the plurality of lanes. The method can further comprise translating coordinates in the cropped and resized video frames into new coordinates based on a uniform coordinate domain prior to detecting the potential traffic violation.

The method can also comprise determining whether a vanishing point is present within the one or more video frames and adjusting at least one of the one or more video image sensors of the edge device or a cropping parameter used to crop the one or more video frames if the vanishing point is not detected.

In some embodiments, the method can comprise receiving, at the edge device, over-the-air (OTA) updates to the first convolutional neural network via a first docker container image and receiving, at the edge device, OTA updates to the second convolutional neural network via a second docker container image. The second docker container image can be separate from the first docker container image.

The method can further comprise receiving the OTA updates by querying a container registry for any updates to the first convolutional neural network or the second convolutional neural network, downloading the first docker container image if an update to the first convolutional neural network is detected and downloading the second docker container image if an update to the second convolutional neural network is detected, creating a first docker container based on the first docker container image or creating a second docker container based on the second docker container image, checking for a compatibility of an update within the first docker container or the second docker container with a kernel-level watchdog via one or more notification flags, running the first docker container or the second docker container for a predetermined test period, and resume running a previous version of the first docker container or the second docker container if a service failure is detected within the predetermined test period or changing a setup of the edge device so the first docker container or the second docker container runs automatically on device boot if no service failures are detected within the predetermined test period.

The method can further comprise receiving, at the edge device, over-the-air (OTA) updates to an operating system (OS) run on the edge device, wherein receiving the OTA updates comprises receiving an OS package URL and a checksum. The OS package URL can be made up of at least a package name and a package version number. The method can also comprise downloading an OS package via the OS package URL when the package version number is different from a version number of an OS running on the edge device, comparing the checksum to ensure the OS package is downloaded successfully, and updating the OS running on the edge device using contents within the OS package downloaded.

Also disclosed is a device for detecting a potential traffic violation. The device can comprise one or more video image sensors configured to capture a video of a vehicle and a plurality of lanes of a roadway, one or more processors programmed to execute instructions to bound the vehicle detected from one or more video frames of the video in a vehicle bounding box, bound a plurality of lanes of a roadway detected from the one or more video frames in a plurality of polygons, and detect that a potential traffic violation has occurred based in part on an overlap of at least part of the vehicle bounding box and at least part of one of the polygons.

In some embodiments, the vehicle can be detected and bounded using a first convolutional neural network and the plurality of lanes can be detected and bounded using multiple heads of a multi-headed second convolutional neural network separate from the first convolutional neural network.

At least one of the polygons can be a lane-of-interest (LOI) polygon bounding a lane-of-interest such as a restricted lane. The device can detect that a potential traffic violation has occurred based in part on an overlap of at least part of the vehicle bounding box and at least part of the LOI polygon.

The device can be coupled to a carrier vehicle. The video can be captured using the one or more video image sensors of the device while the carrier vehicle is in motion. In some embodiments, the device can detect a potential traffic violation involving a moving vehicle. In certain embodiments, both the carrier vehicle carrying the device and the offending vehicle can be in motion.

The one or more processors can be programmed to execute further instructions to discard an upper portion of the vehicle bounding box such that only a lower portion of the vehicle bounding box remains, masking the LOI polygon by filling an area within the LOI polygon with pixels, determining a pixel intensity value associated with each pixel within the lower portion of the vehicle bounding box, calculating a lane occupancy score by taking an average of the pixel intensity values of all pixels within the lower portion of the vehicle bounding box, and detecting the potential traffic violation when the lane occupancy score exceeds a predetermined threshold value. The pixel intensity value can represent a degree of overlap between the LOI polygon and the lower portion of the vehicle bounding box.

The first convolutional neural network can be run by a first worker of an event detection engine on the device. The second convolutional neural network can be run by a second worker of the event detection engine. In some embodiments, the one or more processors can be programmed to execute instructions to transmit outputs from the first convolutional neural network comprising data or information concerning the vehicle bounding box from the first worker to a third worker of the event detection engine using an inter-process communication protocol and transmit outputs from the second convolutional neural network comprising data or information concerning the plurality of polygons and the LOI polygon from the second worker to the third worker using the inter-process communication protocol. The one or more processors can be programmed to execute further instructions to detect the potential traffic violation using the third worker based on data and information received via the inter-process communication protocol from the first worker and the second worker.

The one or more processors can be programmed to execute further instructions to crop and resize the one or more video frames prior to bounding the vehicle in the vehicle bounding box, crop and resize the one or more video frames prior to bounding the plurality of lanes, and translate coordinates in the cropped and resized video frames into new coordinates based on a uniform coordinate domain prior to detecting the potential traffic violation.

The one or more processors can also be programmed to execute instructions to receive, at the device, OTA updates to the first convolutional neural network via a first docker container image, and receive, at the edge device, OTA updates to the second convolutional neural network via a second docker container image, wherein the second docker container image is separate from the first docker container image.

Also disclosed is a non-transitory computer-readable medium comprising machine-executable instructions stored thereon. The machine-executable instructions can comprise the steps of bounding a vehicle detected from one or more video frames of a video in a vehicle bounding box, bounding a plurality of lanes of a roadway detected from the one or more video frames in a plurality of polygons, and detecting a potential traffic violation based in part on an overlap of at least part of the vehicle bounding box and at least part of one of the polygons.

In some embodiments, the vehicle can be detected and bounded using a first convolutional neural network the LOI polygon. The plurality of lanes can be detected and bounded using multiple heads of a multi-headed second convolutional neural network separate from the first convolutional neural network. At least one of the polygons can be a lane-of-interest (LOI) polygon bounding an LOI. The potential traffic violation can be detected based in part on an overlap of at least part of the vehicle bounding box and at least part of the LOI polygon.

The video can be captured by one or more video image sensors of an edge device. In some embodiments, the edge device can be coupled to a carrier vehicle. The video can be captured using the one or more video image sensors of the edge device while the carrier vehicle is in motion.

In some embodiments, the device can detect a potential traffic violation involving a moving vehicle. In certain embodiments, both the carrier vehicle carrying the edge device and the offending vehicle can be in motion.

The machine-executable instructions can also comprise the steps of discarding an upper portion of the vehicle bounding box such that only a lower portion of the vehicle bounding box remains, masking the LOI polygon by filling an area within the LOI polygon with pixels, determining a pixel intensity value associated with each pixel within the lower portion of the vehicle bounding box, calculating a lane occupancy score by taking an average of the pixel intensity values of all pixels within the lower portion of the vehicle bounding box, and detecting the potential traffic violation when the lane occupancy score exceeds a predetermined threshold value. The pixel intensity value can represent a degree of overlap between the LOI polygon and the lower portion of the vehicle bounding box.

The machine-executable instructions can further comprise the steps of transmitting outputs from the first convolutional neural network comprising data or information concerning the vehicle bounding box from a first worker to a third worker of the event detection engine using an inter-process communication protocol (e.g., user datagram protocol (UDP) sockets), transmitting outputs from the second convolutional neural network comprising data or information concerning the plurality of polygons and the LOI polygon from a second worker to the third worker using the inter-process communication protocol, and detecting that the potential traffic violation has occurred using the third worker based on data and information received via the inter-process communication protocol from the first worker and the second worker.

The first convolutional neural network can be run by the first worker of an event detection engine. The second convolutional neural network can be run by the second worker of the event detection engine.

The machine-executable instructions can further comprise the steps of cropping and resizing the one or more video frames prior to bounding the vehicle in the vehicle bounding box, cropping and resizing the one or more video frames prior to bounding the plurality of lanes, and translating coordinates in the cropped and resized video frames into new coordinates based on a uniform coordinate domain prior to detecting the potential traffic violation.

The machine-executable instructions can further comprise the steps of receiving, at the edge device, over-the-air (OTA) updates to the first convolutional neural network via a first docker container image and receiving, at the edge device, OTA updates to the second convolutional neural network via a second docker container image. The second docker container image can be separate from the first docker container image.

BRIEF DESCRIPTION OF THE DRAWINGS

FIGS. 12A and 12B illustrate one embodiment of a method of calculating a lane occupancy score.

DETAILED DESCRIPTION

Figure 1A:
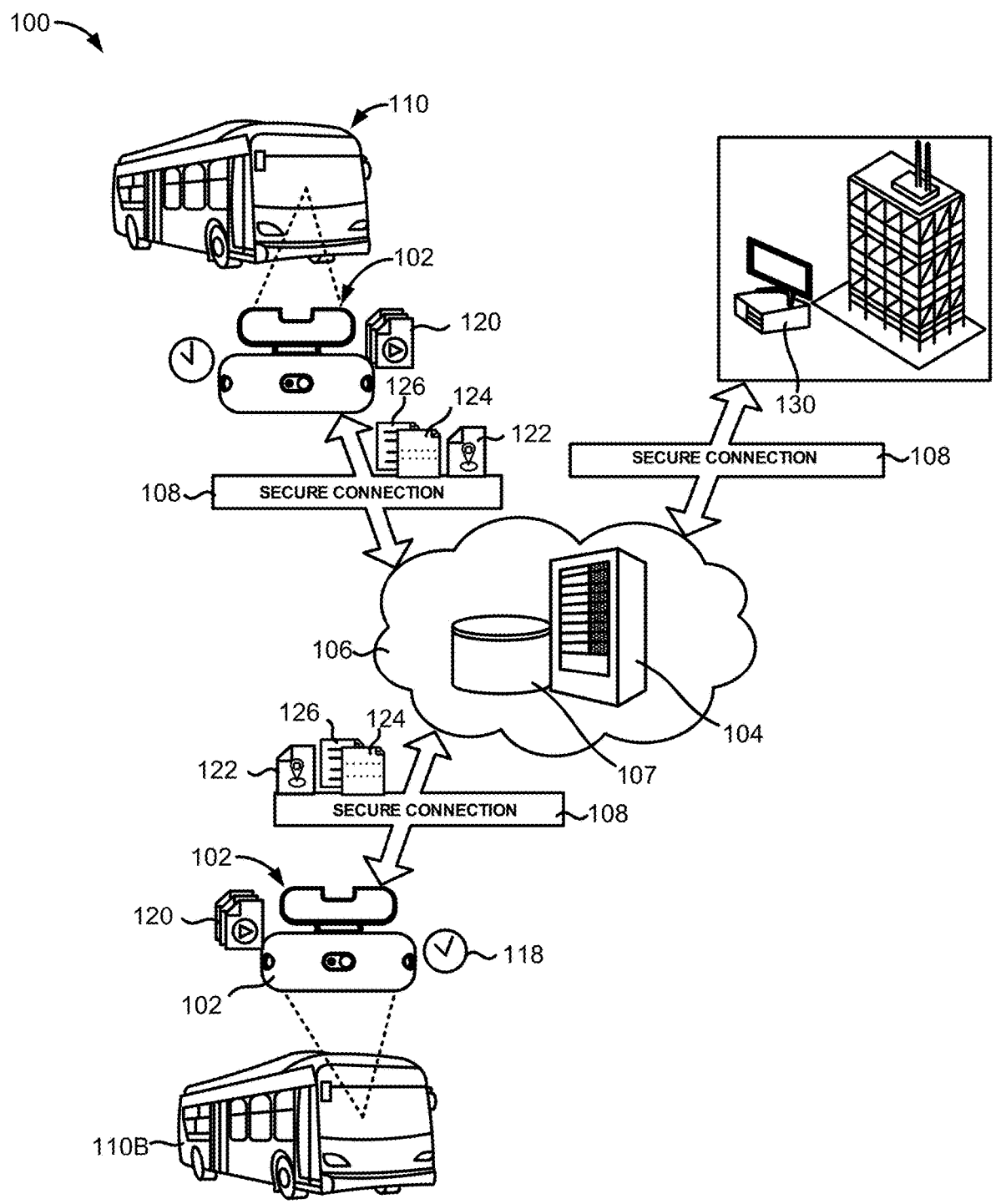
FIG. 1A illustrates one embodiment of a system for detecting traffic violations.

FIG. 1A illustrates one embodiment of a system 100 for detecting traffic violations. The system 100 can comprise a plurality of edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database. In further embodiments, the database 107 can be a column-oriented or key-value database. In certain embodiments, the database 107 can be stored in a server memory or storage unit 220. In other embodiments, the database 107 can be distributed among multiple storage nodes.

As will be discussed in more detail in the following sections, each of the edge devices 102 can be carried by or installed in a carrier vehicle 110 (see FIG. 4 for examples of different types of carrier vehicles 110).

For example, the edge device 102 can be secured or otherwise coupled to a windshield, window, or dashboard/deck of the carrier vehicle 110. Also, for example, the edge device 102 can be secured or otherwise coupled to a handlebar/handrail of a micro-mobility vehicle serving as the carrier vehicle 110. Alternatively, the edge device 102 can be secured or otherwise coupled to a mount or body of a UAV or drone serving as the carrier vehicle 110.

When properly coupled or secured to the windshield, window, or dashboard/deck of the carrier vehicle 110 or secured to a handrail, handlebar, or mount/body of the carrier vehicle 110, the edge device 102 can use its video image sensors 208 (see, e.g., FIG. 5A-5E) to capture videos of an external environment within a field view of the video image sensors 208. Each of the edge devices 102 can then process and analyze video frames from such videos using certain computer vision tools from a computer vision library and a plurality of deep learning models to detect whether a potential traffic violation has occurred. If the edge device 102 determines that a potential traffic violation has occurred, the edge device 102 can transmit data and files concerning the potential traffic violation (e.g., in the form of an evidence package) to the server 104.

Figure 1B:
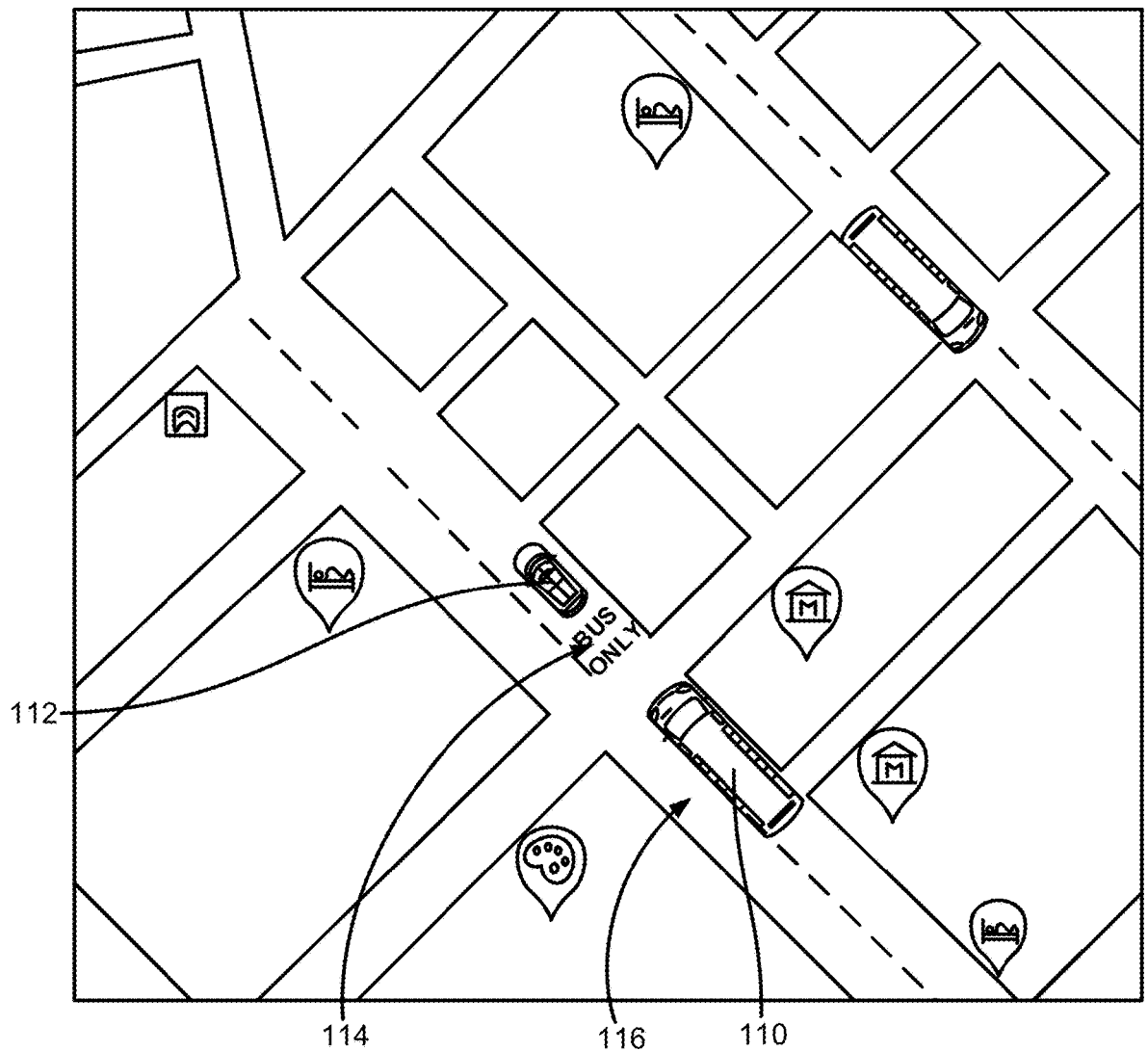
FIG. 1B illustrates a scenario where the system of FIG. 1A can be utilized to detect a traffic violation.

FIG. 1B illustrates a scenario where the system 100 of FIG. 1A can be utilized to detect a traffic violation. As shown in FIG. 1B, a vehicle 112 can be parked or otherwise stopped in a restricted road area 114. The restricted road area 114 can be a bus lane, a bike lane, a no parking or no stopping zone (e.g., a no-parking zone in front of a red curb or fire hydrant), a pedestrian crosswalk, or a combination thereof. In other embodiments, the restricted road area 114 can be a restricted parking spot where the vehicle 112 does not have the necessary credentials or authorizations to park in the parking spot. The restricted road area 114 can be marked by certain insignia, text, nearby signage, road or curb coloration, or a combination thereof. In other embodiments, the restricted road area 114 can be designated or indicated in a private or public database (e.g., a municipal GIS database) accessible by the edge device 102, the server 104, or a combination thereof.

The traffic violation can also include illegal double-parking, parking in a space where the time has expired, or parking too close to a fire hydrant.

As shown in FIG. 1B, a carrier vehicle 110 having an edge device 102 (see, e.g., FIG. 1A) installed within the carrier vehicle 110 or otherwise coupled to the carrier vehicle 110 can drive by (i.e., next to) or behind the vehicle 112 parked, stopped, or driving in the restricted road area 114. For example, the carrier vehicle 110 can be driving in a lane or other roadway blocked by the vehicle 112. Alternatively, the carrier vehicle 110 can be driving in an adjacent roadway 116 such as a lane next to the restricted road area 114. The carrier vehicle 110 can encounter the vehicle 112 while traversing its daily route (e.g., bus route, garbage collection route, etc.).

As shown in FIG. 1A, the edge device 102 can capture a video 120 of the vehicle 112 and at least part of the restricted road area 114 using one or more video image sensors 208 (see, e.g., FIGS. 5A-5E) of the edge device 102.

In one embodiment, the video 120 can be a video in the MPEG-4 Part 12 or MP4 file format.

In some embodiments, the video 120 can refer to one of the multiple videos captured by the various video image sensors 208. In other embodiments, the video 120 can refer to one compiled video comprising multiple videos captured by the video image sensors 208. In further embodiments, the video 120 can refer to all of the videos captured by all of the video image sensors 208.

The edge device 102 can then determine a location of the vehicle 112 using, in part, a positioning data 122 obtained from a positioning unit (see, e.g., FIG. 2A) of the edge device 102. The edge device 102 can also determine the location of the vehicle 112 using, in part, inertial measurement data obtained from an IMU (see, e.g., FIG. 2A) and wheel odometry data 216 (see, FIG. 2A) obtained from a wheel odometer of the carrier vehicle 110.

Figure 3:
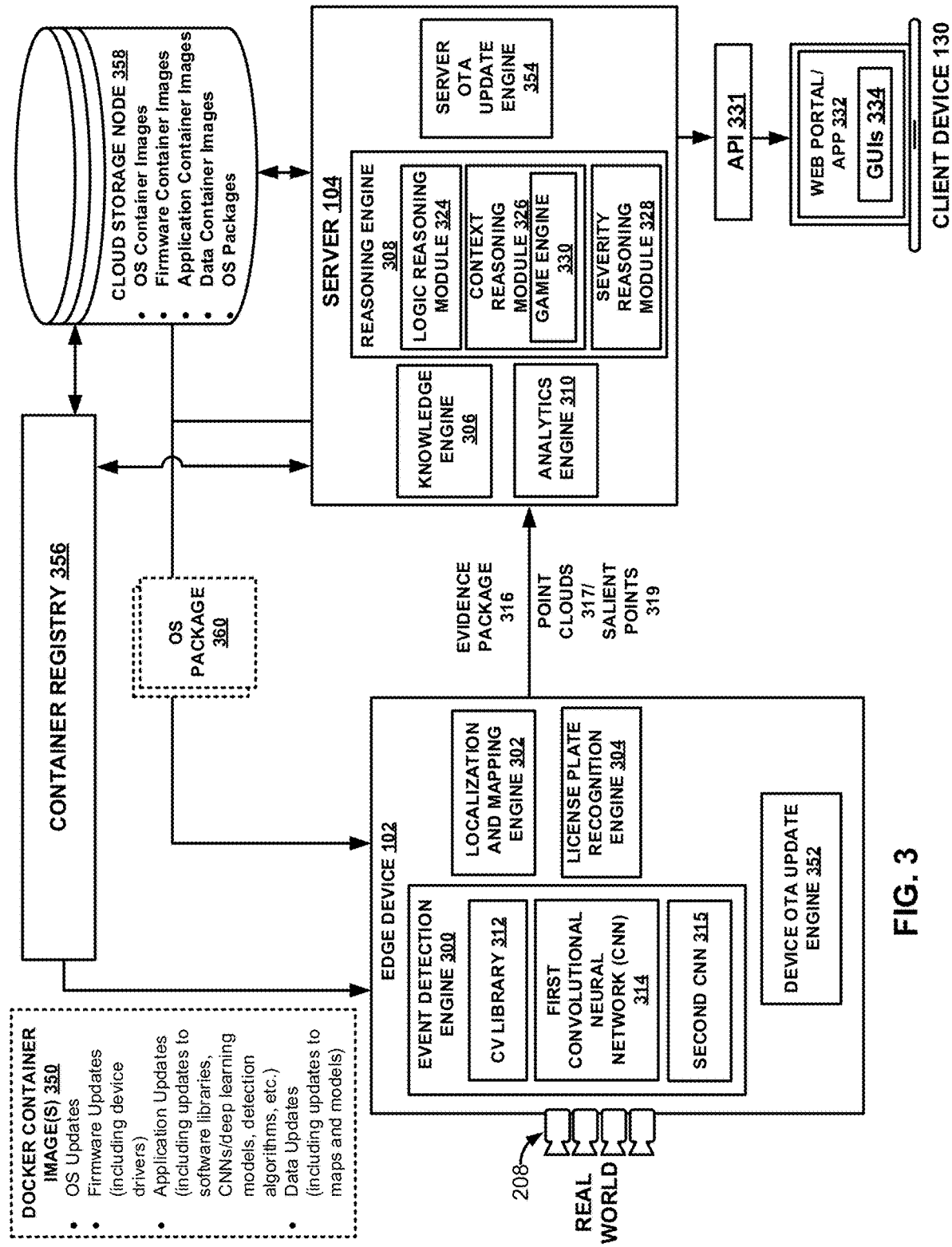
FIG. 3 illustrates various modules and engines of the edge device and server.

One or more processors of the edge device 102 can be programmed to automatically identify objects from the video 120 by applying a plurality of functions from a computer vision library 312 (see, e.g., FIG. 3) to the video 120 to, among other things, read video frames from the video 120 and pass at least some of the video frames from the video 120 to a plurality of deep learning models (see, e.g., the first convolutional neural network 314 and the second convolutional neural network 315 in FIG. 3) running on the edge device 102. For example, the vehicle 112 and the restricted road area 114 can be identified as part of this object detection step.

In some embodiments, the one or more processors of the edge device 102 can also pass at least some of the video frames of the video 120 to one or more of the deep learning models to identify a set of vehicle attributes 126 of the vehicle 112. The set of vehicle attributes 126 can include a color of the vehicle 112, a make and model of the vehicle 112, and a vehicle type (e.g., a personal vehicle or a public service vehicle such as a fire truck, ambulance, parking enforcement vehicle, police car, etc.) identified by the edge device 102.

At least one of the video image sensors 208 of the edge device 102 can be a dedicated license plate recognition (LPR) camera. The video 120 can comprise at least one video frame or image showing a license plate of the vehicle 112. The edge device 102 can pass the video frame captured by the LPR camera to a license plate recognition engine 304 running on the edge device 102 (see, e.g., FIG. 3) to recognize an alphanumeric string 124 representing a license plate of the vehicle 112.

In other embodiments not shown in the figures, the license plate recognition engine 304 can be run on the server 104. In further embodiments, the license plate recognition engine 304 can be run on the edge device 102 and the server 104.

Alternatively, the edge device 102 can pass a video frame captured by one of the other video image sensors 208 (e.g., one of the HDR cameras) to the license plate recognition engine 304 run on the edge device 102, the server 104, or a combination thereof.

The edge device 102 can also transmit an evidence package 316 comprising a segment of the video 120, the positioning data 122, certain timestamps 118, the set of vehicle attributes 126, and an alphanumeric string 124 representing a license plate of the vehicle 112 to the server 104.

In some embodiments, the length of the video 120 transmitted to the server 104 can be configurable or adjustable.

Each of the edge devices 102 can be configured to continuously take videos of its surrounding environment (i.e., an environment outside of the carrier vehicle 110) as the carrier vehicle 110 traverses its usual route. In some embodiments, each edge device 102 can also be configured to apply additional functions from the computer vision library 312 to such videos to (i) automatically segment video frames at a pixel-level, (ii) extract salient points 319 from the video frames, (iii) automatically identify objects shown in the videos, and (iv) semantically annotate or label the objects using one or more of the deep learning models. The one or more processors of each edge device 102 can also continuously determine the location of the edge device 102 and associate positioning data with objects (including landmarks) identified from the videos. The edge devices 102 can then transmit the videos, the salient points 317, the identified objects and landmarks, and the positioning data to the server 104 as part of a mapping procedure. The edge devices 102 can periodically or continuously transmit such videos and mapping data to the server 104. The videos and mapping data can be used by the server 104 to continuously train and optimize the deep learning models and construct three-dimensional (3D) semantic annotated maps that can be used, in turn, by each of the edge devices 102 to further refine its violation detection capabilities.

In some embodiments, the system 100 can offer an application programming interface (API) 331 (see FIG. 3) designed to allow third-parties to access data and visualizations captured or collected by the edge devices 102, the server 104, or a combination thereof.

FIG. 1A also illustrates that the server 104 can transmit certain data and files to a third-party computing device/ resource or client device 130. For example, the third-party computing device can be a server or computing resource of a third-party traffic violation processor. As a more specific example, the third-party computing device can be a server or computing resource of a government vehicle registration department. In other examples, the third-party computing device can be a server or computing resource of a sub-contractor responsible for processing traffic violations for a municipality or other government entity.

The client device 130 can refer to a portable or non-portable computing device. For example, the client device 130 can refer to a desktop computer or a laptop computer. In other embodiments, the client device 130 can refer to a tablet computer or smartphone.

The server 104 can also generate or render a number of graphical user interfaces (GUIs) 334 (see, e.g., FIG. 3) that can be displayed through a web portal or mobile app run on the client device 130.

In some embodiments, at least one of the GUIs 334 can provide information concerning a potential traffic violation or determined traffic violation. For example, the GUI 334 can provide data or information concerning a time/date that the violation occurred, a location of the violation, a device identifier, and a carrier vehicle identifier. The GUI 334 can also provide a video player configured to play back video evidence of the traffic violation.

In another embodiment, the GUI 334 can comprise a live map showing real-time locations of all edge devices 102, traffic violations, and violation hot-spots. In yet another embodiment, the GUI 334 can provide a live event feed of all flagged events or potential traffic violations and the processing status of such violations. The GUIs 334 and the web portal or app 332 will be discussed in more detail in later sections.

The server 104 can also confirm or determine that a traffic violation has occurred based in part on comparing data and videos received from the edge device 102 and other edge devices 102.

Figure 2A:
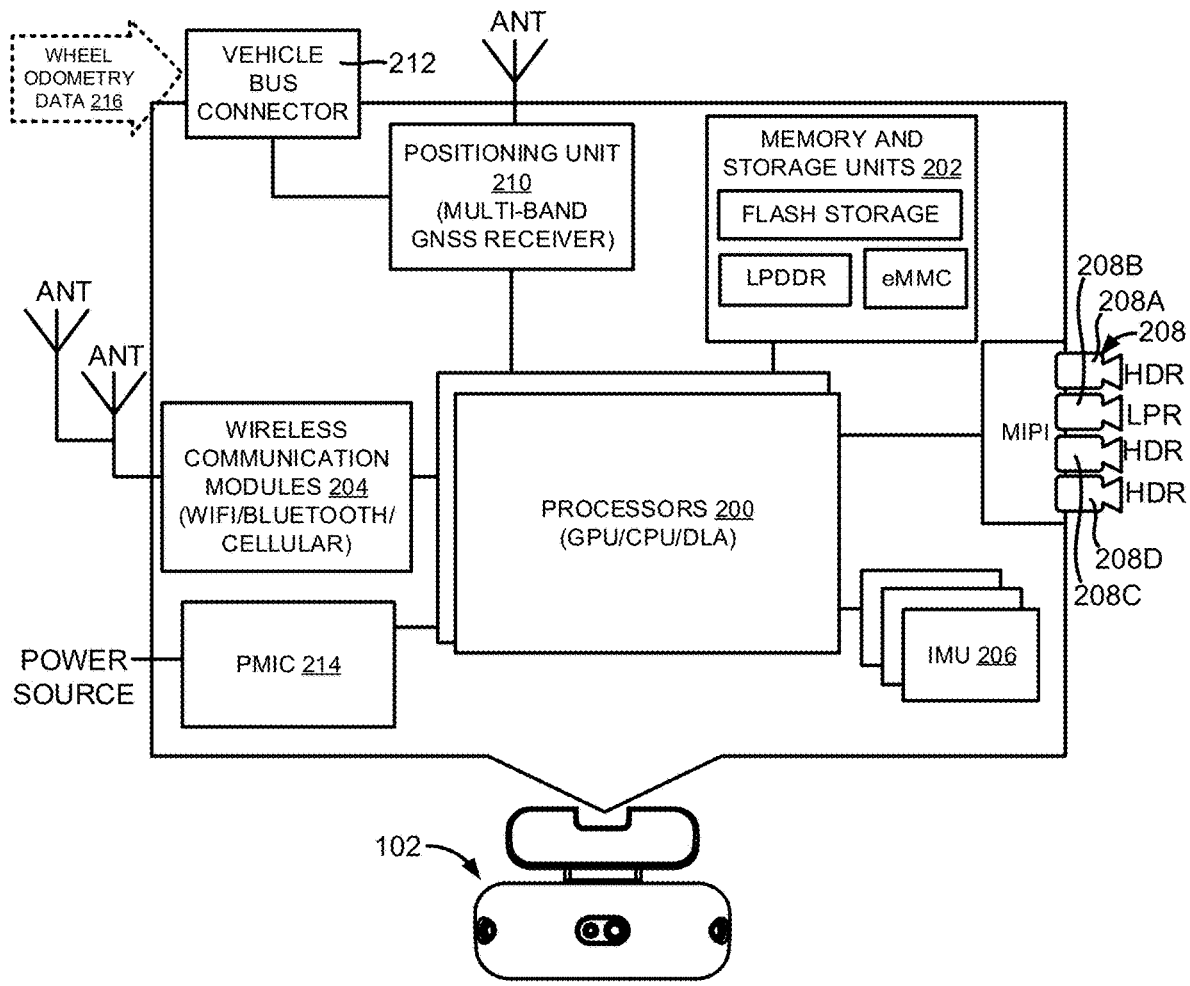
FIG. 2A illustrates one embodiment of an edge device of the system.

FIG. 2A illustrates one embodiment of an edge device 102 of the system 100. The edge device 100 can be any of the edge devices disclosed herein. For purposes of this disclosure, any references to the edge device 102 can also be interpreted as a reference to a specific component, processor, module, chip, or circuitry within the edge device 102.

As shown in FIG. 2A, the edge device 102 can comprise a plurality of processors 200, memory and storage units 202, wireless communication modules 204, inertial measurement units (IMUs) 206, and video image sensors 208. The edge device 102 can also comprise a positioning unit 210, a vehicle bus connector 212, and a power management integrated circuit (PMIC) 214. The components of the edge device 102 can be connected to one another via high-speed buses or interfaces.

The processors 200 can include one or more central processing units (CPUs), graphical processing units (GPUs), Application-Specific Integrated Circuits (ASICs), field-programmable gate arrays (FPGAs), or a combination thereof. The processors 200 can execute software stored in the memory and storage units 202 to execute the methods or instructions described herein.

For example, the processors 200 can refer to one or more GPUs and CPUs of a processor module configured to perform operations or undertake calculations at a terascale. As a more specific example, the processors 200 of the edge device 102 can be configured to perform operations at 21 teraflops (TFLOPS). The processors 200 of the edge device 102 can be configured to run multiple deep learning models or neural networks in parallel and process data from multiple high-resolution sensors such as the plurality of video image sensors 208. More specifically, the processor module can be a Jetson Xavier NX™ module developed by NVIDIA Corporation. The processors 200 can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially-designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the edge device 102.

The memory and storage units 202 can comprise volatile memory and non-volatile memory or storage. For example, the memory and storage units 202 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units 202 can comprise a 512 gigabyte (GB) SSD, an 8 GB 128-bit LPDDR4x memory, and 16 GB eMMC 5.1 storage device. Although FIG. 2A illustrates the memory and storage units 202 as separate from the processors 200, it should be understood by one of ordinary skill in the art that the memory and storage units 202 can be part of a processor module comprising at least some of the processors 200. The memory and storage units 202 can store software, firmware, data (including video and image data), tables, logs, databases, or a combination thereof.

The wireless communication modules 204 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the edge device 102 to communicate over a WiFi network such as a WiFi network provided by the carrier vehicle 110, a municipality, a business, or a combination thereof. The WiFi communication module can allow the edge device 102 to communicate over one or more WiFi (IEEE 802.11) commination protocols such as the 802.11n, 802.11ac, or 802.11ax protocol.

The Bluetooth® module can allow the edge device 102 to communicate with other edge devices or client devices over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 204 can comprise a combined WiFi and Bluetooth® module.

Each of the IMUs 206 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs 206 can be a low-power 6-axis IMU provided by Bosch Sensortec GmbH.

The edge device 102 can comprise one or more video image sensors 208. In one example embodiment, the edge device 102 can comprise a plurality of video image sensors 208. As a more specific example, the edge device 102 can comprise four video image sensors 208 (e.g., a first video image sensor 208A, a second video image sensor 208B, a third video image sensor 208C, and a fourth video image sensor 208D). At least one of the video image sensors 208 can be configured to capture video at a frame rate of between 1 frame per second and 120 frames per second (FPS) (e.g., about 30 FPS). In other embodiments, at least one of the video image sensors 208 can be configured to capture video at a frame rate of between 20 FPS and 80 FPS.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 megapixels (MP)). The LPR camera can also capture video at a frame rate of between 1 frame per second and 120 FPS. In other embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light high-dynamic range (HDR) image sensors. The HDR image sensors can capture video images at a minimum resolution of 1920×1080 (or 2 MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors provided by Sony Semiconductor Solutions Corporation.

The video image sensors 208 can be connected to the processors 200 via a high-speed camera interface such as a Mobile Industry Processor Interface (MIPI) camera serial interface.

In alternative embodiments, the video image sensors 208 can refer to built-in video image sensors of the carrier vehicle 110. For example, the video images sensors 208 can refer to one or more built-in cameras included as part of the carrier vehicle's Advanced Driver Assistance Systems (ADAS).

The edge device 102 can also comprise a high-precision automotive-grade positioning unit 210. The positioning unit 210 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 210 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 210 be configured to receive signals from all four of the aforementioned satellite navigation systems or three out of the four satellite navigation systems. For example, the positioning unit 210 can be a ZED-F9K dead reckoning module provided by u-blox holding AG.

The positioning unit 210 can provide positioning data that can allow the edge device 102 to determine its own location at a centimeter-level accuracy. The positioning unit 210 can also provide positioning data that can be used by the edge device 102 to determine the location of the vehicle 112. For example, the edge device 102 can use positioning data concerning its own location to substitute for the location of the vehicle 112. The edge device 102 can also use positioning data concerning its own location to estimate or approximate the location of the vehicle 112.

In other embodiments, the edge device 102 can determine the location of the vehicle 112 by recognizing an object or landmark (e.g., a bus stop sign) near the vehicle 112 with a known geolocation associated with the object or landmark. In these embodiments, the edge device 102 can use the location of the object or landmark as the location of the vehicle 112. In further embodiments, the location of the vehicle 112 can be determined by factoring in a distance calculated between the edge device 102 and the vehicle 112 based on a size of the license plate shown in one or more video frames of the video captured by the edge device 112 and a lens parameter of one of the video images sensors 208 (e.g., a zoom factor of the lens).

FIG. 2A also illustrates that the edge device 102 can comprise a vehicle bus connector 212. For example, the vehicle bus connector 212 can allow the edge device 102 to obtain wheel odometry data 216 from a wheel odometer of the carrier vehicle 110 carrying the edge device 102. For example, the vehicle bus connector 212 can be a J1939 connector. The edge device 102 can take into account the wheel odometry data 216 to determine the location of the vehicle 112 (see, e.g., FIG. 1B).

FIG. 2A illustrates that the edge device can comprise a PMIC 214. The PMIC 214 can be used to manage power from a power source. In some embodiments, the edge device 102 can be powered by a portable power source such as a battery. In other embodiments, the edge device 102 can be powered via a physical connection (e.g., a power cord) to a power outlet or direct-current (DC) auxiliary power outlet (e.g., 12V/24V) of the carrier vehicle 110.

Figure 2B:
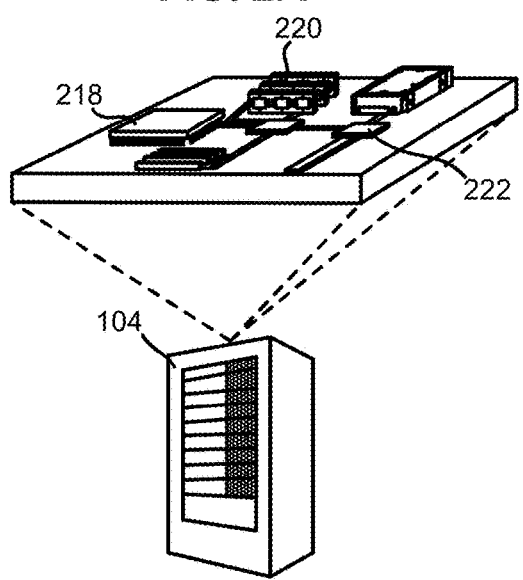
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 218, server memory and storage units 220, and a server communication interface 222. The server processors 218 can be coupled to the server memory and storage units 220 and the server communication interface 222 through high-speed buses or interfaces.

The one or more server processors 218 can comprise one or more CPUs, GPUs, ASICs, FPGAs, or a combination thereof. The one or more server processors 218 can execute software stored in the server memory and storage units 220 to execute the methods or instructions described herein. The one or more server processors 218 can be embedded processors, processor cores, microprocessors, logic circuits, hardware FSMs, DSPs, or a combination thereof. As a more specific example, at least one of the server processors 218 can be a 64-bit processor.

The server memory and storage units 220 can store software, data (including video or image data), tables, logs, databases, or a combination thereof. The server memory and storage units 220 can comprise an internal memory and/or an external memory, such as a memory residing on a storage node or a storage server. The server memory and storage units 220 can be a volatile memory or a non-volatile memory. For example, the server memory and storage units 220 can comprise nonvolatile storage such as NVRAM, Flash memory, solid-state drives, hard disk drives, and volatile storage such as SRAM, DRAM, or SDRAM.

The server communication interface 222 can refer to one or more wired and/or wireless communication interfaces or modules. For example, the server communication interface 222 can be a network interface card. The server communication interface 222 can comprise or refer to at least one of a WiFi communication module, a cellular communication module (e.g., a 4G or 5G cellular communication module), and a Bluetooth®/BLE or other-type of short-range communication module. The server 104 can connect to or communicatively couple with each of the edge devices 102 via the server communication interface 222. The server 104 can transmit or receive packets of data using the server communication interface 222.

FIG. 3 illustrates certain modules and engines of the edge device 102 and the server 104. In some embodiments, the edge device 102 can comprise at least an event detection engine 300, a localization and mapping engine 302, and a license plate recognition engine 304. In these and other embodiments, the server 104 can comprise at least a knowledge engine 306, a reasoning engine 308, and an analytics engine 310.

Software instructions run on the edge device 102, including any of the engines and modules disclosed herein, can be written in the Java® programming language, C++ programming language, the Python® programming language, the Golang™ programming language, or a combination thereof. Software instructions run on the server 104, including any of the engines and modules disclosed herein, can be written in the Ruby® programming language (e.g., using the Ruby on Rails® web application framework), Python® programming language, or a combination thereof.

As previously discussed, the edge device 102 can continuously capture video of an external environment surrounding the edge device 102. For example, the video image sensors 208 of the edge device 102 can capture everything that is within a combined field of view 512 (see, e.g., FIG. 5C) of the video image sensors 208.

The event detection engine 300 can call a plurality of functions from a computer vision library 312 to read or otherwise obtain frames from the video (e.g., the video 120) and enhance the video images by resizing, cropping, or rotating the video images.

In one example embodiment, the computer vision library 312 can be the OpenCV® library maintained and operated by the Open Source Vision Foundation. In other embodiments, the computer vision library 312 can be or comprise functions from the TensorFlow® software library, the SimpleCV® library, or a combination thereof.

The event detection engine 300 can then apply a semantic segmentation function from the computer vision library 312 to automatically annotate the video images at a pixel-level with semantic labels. The semantic labels can be class labels such as person, road, tree, building, vehicle, curb, sidewalk, traffic lights, traffic sign, curbside city assets such as fire hydrants, parking meter, lane line, landmarks, curbside side attributes (color/markings), etc. Pixel-level semantic segmentation can refer to associating a class label with each pixel of a video image.

The enhanced and semantically segmented images can be provided as training data by the event detection engine 300 to the deep learning models running on the edge device 102. The enhanced and semantically segmented images can also be transmitted by the edge device 102 to the server 104 to be used to construct various semantic annotated maps 318 stored in the knowledge engine 306 of the server 104.

As shown in FIG. 3, the edge device 102 can also comprise a license plate recognition engine 304. The license plate recognition engine 304 can be configured to recognize license plate numbers of vehicles in the video frames. For example, the license plate recognition engine 304 can pass a video frame or image captured by a dedicated LPR camera of the edge device 102 (e.g., the second video image sensor 208B of FIGS. 2A, 5A, and 5D) to a machine learning model specifically trained to recognize license plate numbers from video images. Alternatively, the license plate recognition engine 304 can pass a video frame or image captured by one of the HDR image sensors (e.g., the first video image sensor 208A, the third video image sensor 208C, or the fourth video image sensor 208D) to the machine learning model trained to recognize license plate numbers from such video frames or images.

As a more specific example, the machine learning model can be or comprise a deep learning network or a convolutional neural network specifically trained to recognize license plate numbers from video images. In some embodiments, the machine learning model can be or comprise the OpenALPR™ license plate recognition model. The license plate recognition engine 304 can use the machine learning model to recognize alphanumeric strings representing license plate numbers from video images comprising license plates.

In alternative embodiments, the license plate recognition engine 304 can be run on the server 104. In additional embodiments, the license plate recognition engine 304 can be run on both the edge device 102 and the server 104.

When a vehicle (e.g., the vehicle 112) is driving or parked illegally in a restricted road area 114 (e.g., a bus lane or bike lane), the event detection engine 300 can bound the vehicle captured in the video frames with a vehicle bounding box and bound at least a segment of the restricted road area 114 captured in the video frames with a polygon. Moreover, the event detection engine 300 can identify the color of the vehicle, the make and model of the vehicle, and the vehicle type from video frames or images. The event detection engine 300 can detect at least some overlap between the vehicle bounding box and the polygon when the vehicle is captured driving or parked in the restricted road area 114.

The event detection engine 300 can detect that a potential traffic violation has occurred based on a detected overlap between the vehicle bounding box and the polygon. The event detection engine 300 can then generate an evidence package 316 to be transmitted to the server 104. In some embodiments, the evidence package 316 can comprise clips or segments of the relevant video(s) captured by the edge device 102, a timestamp of the event recorded by the event detection engine 300, an alphanumeric string representing the license plate number of the offending vehicle (e.g., the vehicle 112), and the location of the offending vehicle as determined by the localization and mapping engine 302.

The localization and mapping engine 302 can determine the location of the offending vehicle (e.g., the vehicle 112) using any combination of positioning data obtained from the positioning unit 210, inertial measurement data obtained from the IMUs 206, and wheel odometry data 216 obtained from the wheel odometer of the carrier vehicle 110 carrying the edge device 102. For example, the localization and mapping engine 302 can use positioning data concerning the current location of the edge device 102 to estimate or approximate the location of the offending vehicle. Moreover, the localization and mapping engine 302 can determine the location of the offending vehicle by recognizing an object or landmark (e.g., a bus stop sign) near the vehicle with a known geolocation associated with the object or landmark. In some embodiments, the localization and mapping engine 302 can further refine the determined location of the offending vehicle by factoring in a distance calculated between the edge device 102 and the offending vehicle based on a size of the license plate shown in one or more video frames and a lens parameter of one of the video images sensors 208 (e.g., a zoom factor of the lens) of the edge device 102.

The localization and mapping engine 302 can also be configured to call on certain functions from the computer vision library 312 to extract point clouds 317 comprising a plurality of salient points 319 (see, also, FIG. 7) from the videos captured by the video image sensors 208. The salient points 319 can be visually salient features or key points of objects shown in the videos. For example, the salient points 319 can be the key features of a building, a vehicle, a tree, a road, a fire hydrant, etc. The point clouds 317 or salient points 319 extracted by the localization and mapping engine 302 can be transmitted from the edge device 102 to the server 104 along with any semantic labels used to identify the objects defined by the salient points 319. The point clouds 317 or salient points 319 can be used by the knowledge engine 306 of the server 104 to construct three-dimensional (3D) semantic annotated maps 318. The 3D semantic annotated maps 318 can be maintained and updated by the server 104 and transmitted back to the edge devices 102 to aid in violation detection.

In this manner, the localization and mapping engine 302 can be configured to undertake simultaneous localization and mapping. The localization and mapping engine 302 can associate positioning data with landmarks, structures, and roads shown in the videos captured by the edge device 102. Data and video gathered by each of the edge devices 102 can be used by the knowledge engine 306 of the server 104 to construct and maintain the 3D semantic annotated maps 318. Each of the edge devices 102 can periodically or continuously transmit the salient points 319/points clouds, semantic labels, and positioning data gathered by the localization and mapping engine 302 to the server 104 for the purposes of constructing and maintaining the 3D semantic annotated maps 318.

The knowledge engine 306 of the server 104 can be configured to construct a virtual 3D environment representing the real-world environment captured by the video image sensors 208 of the edge devices 102. The knowledge engine 306 can be configured to construct the 3D semantic annotated maps 318 from videos and data received from the edge devices 102 and continuously update such maps based on new videos or data received from the edge devices 102. The knowledge engine 306 can use inverse perspective mapping to construct the 3D semantic annotated maps 318 from two-dimensional (2D) video image data obtained from the edge devices 102.

The semantic annotated maps 318 can be built on top of existing standard definition maps and can be built on top of geometric maps 320 constructed from sensor data and salient points 319 obtained from the edge devices 102. For example, the sensor data can comprise data from the positioning units 210 and IMUs 206 of the edge devices 102 and wheel odometry data 216 from the carrier vehicles 110.

The geometric maps 320 can be stored in the knowledge engine 306 along with the semantic annotated maps 318. The knowledge engine 306 can also obtain data or information from one or more government mapping databases or government GIS maps to construct or further fine-tune the semantic annotated maps 318. In this manner, the semantic annotated maps 318 can be a fusion of mapping data and semantic labels obtained from multiple sources including, but not limited to, the plurality of edge devices 102, municipal mapping databases, or other government mapping databases, and third-party private mapping databases. The semantic annotated maps 318 can be set apart from traditional standard definition maps or government GIS maps in that the semantic annotated maps 318 are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps 318 and their geolocations and any rules or regulations concerning such objects are also stored as part of the semantic annotated maps 318. As a more specific example, all bus lanes or bike lanes within a municipality and their hours of operation/occupancy can be stored as part of a semantic annotated map 318 of the municipality.

The semantic annotated maps 318 can be updated periodically or continuously as the server 104 receives new mapping data, positioning data, and/or semantic labels from the various edge devices 102. For example, a bus serving as a carrier vehicle 100 having an edge device installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs (e.g., the detected objects, semantic labels, and location data) from such detection can be transmitted to the knowledge engine 306 and compared against data already included as part of the semantic annotated maps 318. If such labels and data match or substantially match what is already included as part of the semantic annotated maps 318, the detection of this roadway or landmark can be corroborated and remain unchanged. If, however, the labels and data do not match what is already included as part of the semantic annotated maps 318, the roadway or landmark can be updated or replaced in the semantic annotated maps 318. An update or replacement can be undertaken if a confidence level or confidence value of the new objects detected is higher than the confidence level or confidence value of objects previously detected by the same edge device 102 or another edge device 102. This map updating procedure or maintenance procedure can be repeated as the server 104 receives more data or information from additional edge devices 102.

As shown in FIG. 3, the server 104 can transmit or deploy revised or updated semantic annotated maps 322 to the edge devices 102. For example, the server 104 can transmit or deploy revised or updated semantic annotated maps 322 periodically or when an update has been made to the existing semantic annotated maps 318. The updated semantic annotated maps 322 can be used by the edge device 102 to more accurately localize restricted road areas 114 to ensure accurate detection. Ensuring that the edge devices 102 have access to updated semantic annotated maps 322 reduces the likelihood of false positive detections.

The knowledge engine 306 can also store all event data or files included as part of any evidence packages 316 received from the edge devices 102 concerning potential traffic violations. The knowledge engine 306 can then pass certain data or information from the evidence package 316 to the reasoning engine 308 of the server 104.

The reasoning engine 308 can comprise a logic reasoning module 324, a context reasoning module 326, and a severity reasoning module 328. The context reasoning module 326 can further comprise a game engine 330 running on the server 104.

The logic reasoning module 324 can use logic (e.g., logic operators) to filter out false positive detections. For example, the logic reasoning module 324 can look up the alphanumeric string representing the detected license plate number of the offending vehicle in a government vehicular database (e.g., a Department of Motor Vehicles database) to see if the registered make/model of the vehicle associated with the detected license plate number matches the vehicle make/ model detected by the edge device 102. If such a comparison results in a mismatch, the potential traffic violation can be considered a false positive. Moreover, the logic reasoning module 324 can also compare the location of the purported restricted road area 114 against a government database of all restricted roadways or zones to ensure that the detected roadway or lane is in fact under certain restrictions or prohibitions against entry or parking. If such comparisons result in a match, the logic reasoning module 324 can pass the data and files included as part of the evidence package 316 to the context reasoning module 326.

The context reasoning module 326 can use a game engine 330 to reconstruct the violation as a game engine simulation in a 3D virtual environment. The context reasoning module 326 can also visualize or render the game engine simulation as a video clip that can be presented through a web portal or app 332 run on a client device 130 in communication with the server 104.

The game engine simulation can be a simulation of the potential traffic violation captured by the video image sensors 208 of the edge device 102.

For example, the game engine simulation can be a simulation of a car parked or driving illegally in a bus lane or bike lane. In this example, the game engine simulation can include not only the car and the bus or bike lane but also other vehicles or pedestrians in the vicinity of the car and their movements and actions.

The game engine simulation can be reconstructed from videos and data received from the edge device 102. For example, the game engine simulation can be constructed from videos and data included as part of the evidence package 316 received from the edge device 102. The game engine 330 can also use semantic labels and other data obtained from the semantic annotated maps 318 to construct the game engine simulation.

In some embodiments, the game engine 330 can be a game engine built on the Unreal Engine® creation platform. For example, the game engine 330 can be the CARLA simulation creation platform. In other embodiments, the game engine 330 can be the Godot™ game engine or the Armory™ game engine.

The context reasoning module 326 can use the game engine simulation to understand a context surrounding the traffic violation. The context reasoning module 326 can apply certain rules to the game engine simulation to determine if a potential traffic violation is indeed a traffic violation or whether the violation should be mitigated. For example, the context reasoning module 326 can determine a causation of the potential traffic violation based on the game engine simulation. As a more specific example, the context reasoning module 326 can determine that the vehicle 112 stopped only temporarily in the restricted road area 114 to allow an emergency vehicle to pass by. Rules can be set by the context reasoning module 326 to exclude certain detected violations when the game engine simulation shows that such violations were caused by one or more mitigating circumstances (e.g., an emergency vehicle passing by or another vehicle suddenly swerving into a lane). In this manner, the context reasoning module 326 can use the game engine simulation to determine that certain potential traffic violations should be considered false positives.

If the context reasoning module 326 determines that no mitigating circumstances are detected or discovered, the data and videos included as part of the evidence package 316 can be passed to the severity reasoning module 328. The severity reasoning module 328 can make the final determination as to whether a traffic violation has indeed occurred by comparing data and videos received from multiple edge devices 102.

As shown in FIG. 3, the server 104 can also comprise an analytics engine 310. The analytics engine 310 can be configured to render visualizations, event feeds, and/or a live map showing the locations of all potential or confirmed traffic violations. The analytics engine 310 can also provide insights or predictions based on the traffic violations detected. For example, the analytics engine 310 can determine violation hotspots and render graphics visualizing such hotspots.

The visualizations, event feeds, and live maps rendered by the analytics engine 310 can be accessed through a web portal or app 332 run on a client device 130 able to access the server 104 or be communicatively coupled to the server 104. The client device 130 can be used by a third-party reviewer (e.g., a law enforcement official or a private contractor) to review the detected traffic violations.

In some embodiments, the web portal can be a browser-based portal and the app can be a downloadable software application such as a mobile application. More specifically, the mobile application can be an Apple® iOS mobile application or an Android® mobile application.

The server 104 can render one or more graphical user interfaces (GUIs) 334 that can be accessed or displayed through the web portal or app 332. For example, one of the GUIs 334 can comprise a live map showing real-time locations of all edge devices 102, traffic violations, and violation hot-spots. Another of the GUIs 334 provide a live event feed of all flagged events or potential traffic violations and the processing status of such violations. Yet another GUI 334 can be a violation review GUI that can play back video evidence of a traffic violation along with data or information concerning a time/date that the violation occurred, a determined location of the violation, a device identifier, and a carrier vehicle identifier. As will be discussed in more detail in the following sections, the violation review GUI can provide a user of the client device 130 with user interface elements to approve or reject a violation.

In other embodiments, the system 100 can offer an application programming interface (API) 331 designed to allow third-parties to access data and visualizations captured or collected by the edge devices 102, the server 104, or a combination thereof.

FIG. 3 also illustrates that the server 104 can receive third-party video and data 336 concerning a potential traffic violation. The server 104 can receive the third-party video and data 336 via one or more application programming interfaces (APIs) 338. For example, the server 104 can receive third-party video and data 336 from a third-party mapping service, a third-party violation detection service or camera operator, or a fleet of autonomous or semiautonomous vehicles. For example, the knowledge engine 306 can use the third party video and data 336 to construct or update the semantic annotated maps 318. Also, for example, the reasoning engine 308 can use the third party video and data 336 to determine whether a traffic violation has indeed occurred and to gauge the severity of the violation. The analytics engine 310 can use the third party video and data 336 to generate graphics, visualizations, or maps concerning violations detected from such third party video and data 336.

The edge device 102 can combine information from multiple different types of sensors and determine, with a high-level of accuracy, an object's type location, and other attributes of the object essential for detecting traffic violations.

In one embodiment, the edge device 102 can fuse sensor data received from optical sensors such as the video image sensors 208, mechanical sensors such as wheel odometry data 216 obtained from a wheel odometer of the carrier vehicle 110, and electrical sensors that connect to a vehicle's on-board diagnostics (OBD) systems, and IMU-based GPS.

FIG. 3 also illustrates that the edge device 102 can further comprise a device over-the-air (OTA) update engine 352 and the server 104 can comprise a server OTA update engine 354. The web portal or app 332 can be used by the system administrator to manage the OTA updates.

The device OTA update engine 352 and the server OTA update engine 354 can update an operating system (OS) software, a firmware, and/or an application software running on the edge device 102 wirelessly or over the air. For example, the device OTA update engine 352 and the server OTA update engine 354 can update any maps, deep learning models, and/or point cloud data stored or running on the edge device 102 over the air.

The OTA update engine 352 can query a container registry 356 periodically for any updates to software running on the edge device 102 or data or models stored on the edge device 102. In another embodiment, the device OTA update engine 352 can query the server OTA update engine 354 running on the server 104 for any software or data updates.

The software and data updates can be packaged as docker container images 350. For purposes of this disclosure, a docker container image 350 can be defined as a lightweight, standalone, and executable package of software or data that comprises everything needed to run the software or read or manipulate the data including software code, runtime instructions, system tools, system libraries, and system settings. Docker container images 350 can be used to generate or create docker containers on the edge device 102. For example, docker containers can refer to containerized software or data run or stored on the edge device 102. As will be discussed in more detail in later sections, the docker containers can be run as workers (see, e.g., the first worker 702A, the second worker 702B, and the third worker 702C) on the edge device 102.

The docker container images 350 can be managed and distributed by a container registry 356. In some embodiments, the container registry 356 can be provided by a third-party cloud computing provider. For example, the container registry 356 can be the Amazon Elastic Container Registry™. In other embodiments, the container registry 356 can be an application running on the server 104.

In certain embodiments, the docker container images 350 can be stored in a cloud storage node 358 offered by a cloud storage service provider. For example, the docker container images 350 can be stored as objects in an object-based cloud storage environment provided by a cloud storage service provider such as the Amazon™ Simple Storage Service (Amazon S3).

The server OTA update engine 354 can push or upload new software or data updates to the container registry 356 and/or the cloud storage node 358. The server OTA update engine 354 can periodically check for any updates to any device firmware or device drivers from a device manufacturer and package or bundle such updates as docker container images 350 to be pushed or uploaded to the container registry 356 and/or the cloud storage node 358. In some embodiments, a system administrator can use the web portal 332 to upload any software or data updates to the container registry 356 and/or the server 104 via the server OTA update engine 354.

The device OTA update engine 352 can also determine whether the software within the new docker container is running properly. If the device OTA update engine 352 determines that a service running the new docker container has failed within a predetermined test period, the device OTA update engine 352 can resume running a previous version of the docker container. If the device OTA update engine 352 determines that no service failures are detected within the predetermined test period, the device OTA update engine 352 can change a setup of the edge device 102 so the new docker container runs automatically or by default on device boot.

In some embodiments, docker containers and docker container images 350 can be used to update an operating system (OS) running on the edge device 102. In other embodiments, an OS running on the edge device 102 can be updated over the air using an OS package 360 transmitted wirelessly from the server 104, the cloud storage node 358, or another device/server hosting the OS update.

Figure 4:
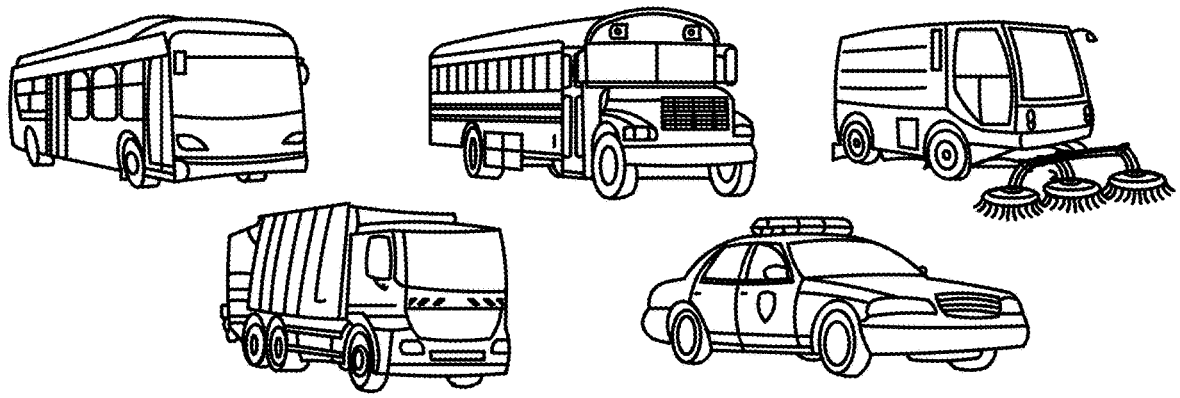
FIG. 4 illustrates different examples of carrier vehicles used to carry the edge device.
Figure 4:
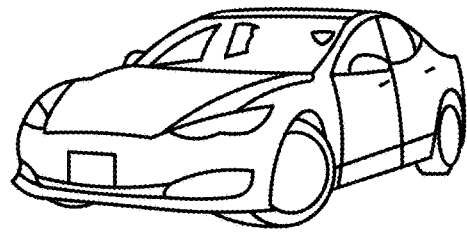
Figure 4:
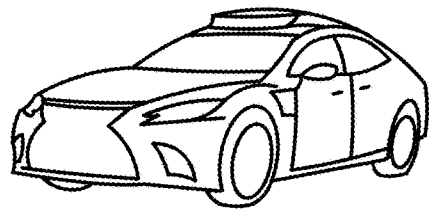

FIG. 4 illustrates that, in some embodiments, the carrier vehicle 400 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

As will be discussed in more detail in the following sections, the edge device 102 can be detachably or removably coupled to the carrier vehicle 400. For example, the edge device 102 can comprise an attachment arm 502 (see FIGS. 5A-5D) for securing or otherwise coupling the edge device 102 to a window or dashboard of the carrier vehicle 110. As a more specific example, the edge device 102 can be coupled to a front windshield, a rear windshield, a side window, a front dashboard, or a rear deck or dashboard of the carrier vehicle 110.

In some embodiments, the edge device 102 can be coupled to an exterior surface or side of the carrier vehicle 110 such as a front, lateral, or rear exterior surface or side of the carrier vehicle 110. In additional embodiments, the edge device 102 can be coupled to a component or arm extending from the carrier vehicle 110. For example, the edge device 102 can be coupled to a stop arm (i.e., an arm carrying a stop sign) of a school bus.

As previously discussed, the system 100 can comprise edge devices 102 installed in or otherwise coupled carrier vehicles 110 deployed within a geographic area or municipality. For example, an edge device 102 can be coupled to a front windshield or dash/deck of each of a bus driving around a city on its daily bus route. Also, for example, an edge device 102 can be coupled to a front windshield or dash/deck of a street sweeper on its daily sweeping route or a garbage/recycling truck on its daily collection route.

It is also contemplated by this disclosure that the edge device 102 can be carried by or otherwise coupled to a micro-mobility vehicle (e.g., an electric scooter). In other embodiments contemplated by this disclosure, the edge device 102 can be carried by or otherwise coupled to a UAV or drone.

Figure 5A:
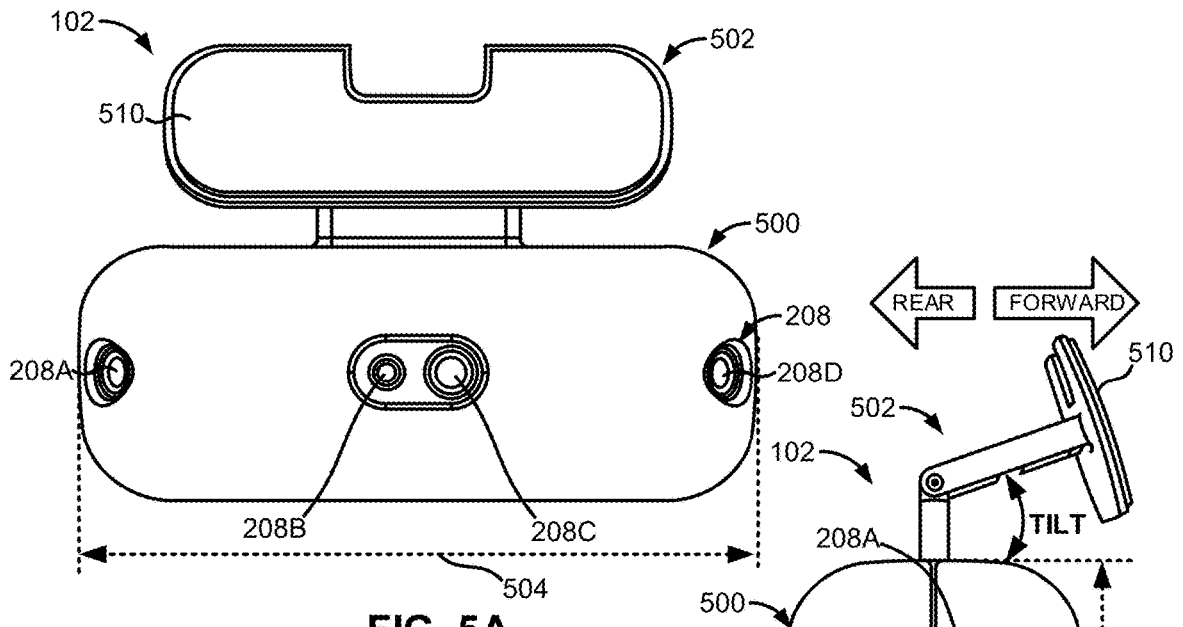
FIG. 5A illustrates a front view of one embodiment of an edge device.
Figures 5B, 5C:
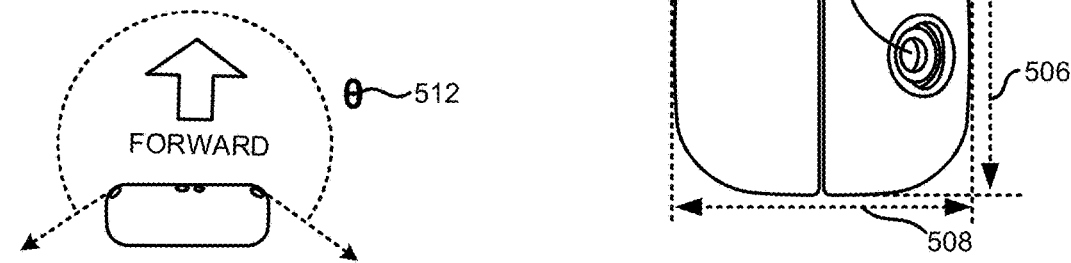
FIG. 5B illustrates a right side view of the embodiment of the edge device shown in FIG. 5A.
FIG. 5C illustrates a combined field of view of cameras housed within the embodiment of the edge device shown in FIG. 5A.

FIGS. 5A and 5B illustrate front and right side views, respectively, of one embodiment of the edge device 102. The edge device 102 can comprise a device housing 500 and an attachment arm 502.

The device housing 500 can be substantially shaped as an elongate cuboid having rounded corners and edges. In other embodiments, the device housing 500 can be substantially shaped as a rectangular box, an ovoid, a truncated pyramid, a sphere, or any combination thereof.

In some embodiments, the device housing 500 can be made in part of a polymeric material, a metallic material, or a combination thereof. For example, the device housing 500 can be made in part of a rigid polymeric material such as polycarbonate, acrylonitrile butadiene styrene (ABS), or a combination thereof. The device housing 500 can also be made in a part of an aluminum alloy, stainless steel, titanium, or a combination thereof. In some embodiments, at least portions of the device housing 500 can be made of glass (e.g., the parts covering the image sensor lenses).

As shown in FIGS. 5A and 5B, when the device housing 500 is implemented as an elongate cuboid, the device housing 500 can have a housing length 504, a housing height 506, and a housing depth 508. In some embodiments, the housing length 504 can be between about 150 mm and about 250 mm. For example, the housing length 504 can be about 200 mm. The housing height 506 can be between about 50 mm and 100 mm. For example, the housing height 506 can be about 75 mm. The housing depth 508 can be between about 50 mm and 100 mm. For example, the housing depth 508 can be about 75 mm.

In some embodiments, the attachment arm 502 can extend from a top of the device housing 500. In other embodiments, the attachment arm 502 can also extend from a bottom of the device housing 500. As shown in FIG. 5B, at least one of the linkages of the attachment arm 502 can rotate with respect to one or more of the other linkage(s) of the attachment arm 502 to tilt the device housing 500. The device housing 500 can be tilted to allow a driver of the carrier vehicle 110 or an installer of the edge device 102 to obtain better camera angles or account for a slant or angle of the vehicle's windshield.

The attachment arm 502 can comprise a high bonding adhesive 510 at a terminal end of the attachment arm 502 to allow the attachment arm 502 to be adhered to a windshield (e.g., a front windshield or a rear windshield), window, or dashboard of the carrier vehicle 110. In some embodiments, the high bonding adhesive 510 can be a very high bonding (VHB) adhesive layer or tape, an ultra-high bonding (UHB) adhesive layer or tape, or a combination thereof. As shown in FIGS. 5B and 5E, in one example embodiment, the attachment arm 502 can be configured such that the adhesive 510 faces forward or in a forward direction above the device housing 500. In other embodiments not shown in the figures but contemplated by this disclosure, the adhesive 510 can face downward below the device housing 500 to allow the attachment arm 502 to be secured to a dashboard or deck of the carrier vehicle 110.

In other embodiments contemplated by this disclosure but not shown in the figures, the attachment arm 502 can be detachably or removably coupled to a windshield, window, or dashboard of the carrier vehicle 110 via a suction mechanism (e.g., one or more releasable high-strength suction cups), a magnetic connector, or a combination thereof with or without adhesives. In additional embodiments, the device housing 500 can be fastened or otherwise coupled to an exterior surface or interior surface of the carrier vehicle 110 via screws or other fasteners, clips, nuts and bolts, adhesives, suction cups, magnetic connectors, or a combination thereof.

In further embodiments contemplated by this disclosure but not shown in the figures, the attachment arm 502 can be detachably or removably coupled to a micro-mobility vehicle or a UAV or drone. For example, the attachment arm 502 can be detachably or removably coupled to a handrail/handlebar of an electric scooter. Also, for example, the attachment arm 502 can be detachably or removably coupled to a mount or body of a drone or UAV.

FIGS. 5A-5D illustrate that the device housing 500 can house or contain all of the electronic components (see, e.g., FIG. 2A) of the edge device 102 including the plurality of video image sensors 208. For example, the video image sensors 208 can comprise a first video image sensor 208A, a second video image sensor 208B, a third video image sensor 208C, and a fourth video image sensor 208D.

As shown in FIG. 5A, one or more of the video image sensors 208 can be angled outward or oriented in one or more peripheral directions relative to the other video image sensors 208 facing forward. The edge device 102 can be positioned such that the forward facing video image sensors (e.g., the second video image sensor 208B and the third video image sensor 208C) are oriented in a direction of forward travel of the carrier vehicle 110. In these embodiments, the angled video image sensors (e.g., the first video image sensor 208A and the fourth video image sensor 208D) can be oriented such that the environment surrounding the carrier vehicle 110 or to the periphery of the carrier vehicle 110 can be captured by the angled video image sensors. The first video image sensor 208A and the fourth video image sensor 208D can be angled with respect to the second video image sensor 208B and the third video image sensor 208C.

In the example embodiment shown in FIG. 5A, the device housing 500 can be configured such that the camera or sensor lenses of the forward-facing image video sensors (e.g., the second video image sensor 208B and the third video image sensor 208C) are exposed along the length or long side of the device housing 500 and each of the angled video image sensors (e.g., the first video image sensor 208A and the fourth video image sensor 208D) is exposed along an edge or side of the device housing 500.

When in operation, the forward-facing video image sensors can capture videos of the environment (e.g., the roadway, other vehicles, buildings, or other landmarks) mostly in front of the carrier vehicle 110 and the angled video image sensors can capture videos of the environment mostly to the sides of the carrier vehicle 110. As a more specific example, the angled video image sensors can capture videos of adjacent lane(s), vehicle(s) in the adjacent lane(s), a sidewalk environment including people or objects (e.g., fire hydrants or other municipal assets) on the sidewalk, and buildings facades.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 MP). The LPR camera can also capture video at a frame rate of between 1 frame per second and 120

FPS. In some embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light HDR image sensors. The HDR image sensors can capture video images at a minimum resolution of 1920×1080 (or 2 MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors distributed by Sony Semiconductor Solutions Corporation.

FIG. 5C illustrates that the video image sensors 208 housed within the embodiment of the edge device 102 shown in FIG. 5A can have a combined field of view 512 of greater than 180 degrees. For example, the combined field of view 512 can be about 240 degrees. In other embodiments, the combined field of view 512 can be between 180 degrees and 240 degrees.

Figure 5D:
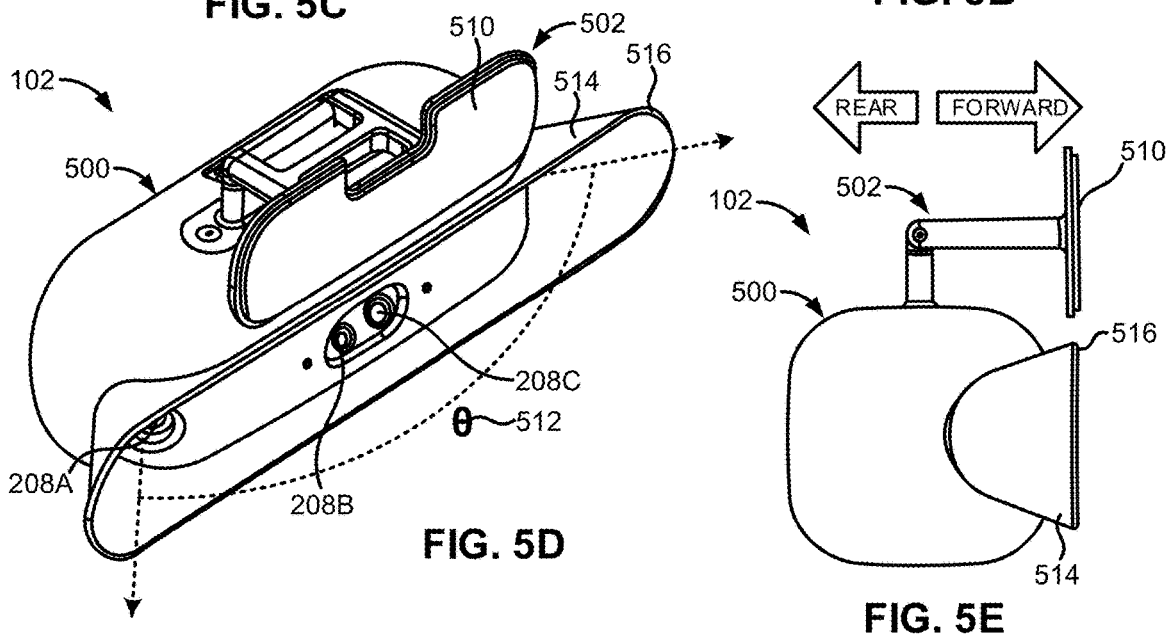
FIG. 5D illustrates a perspective view of another embodiment of the edge device having a camera skirt.
Figure 5E:
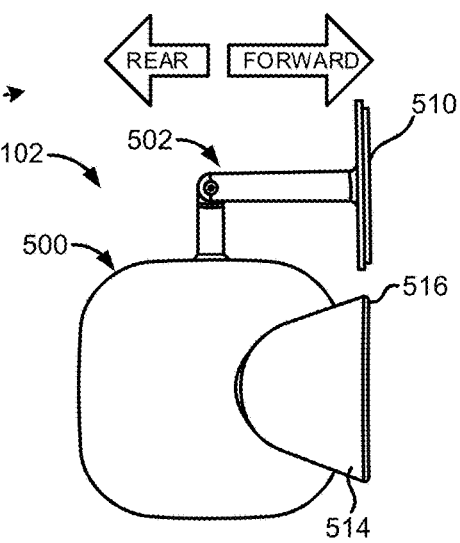
FIG. 5E illustrates a right side view of the embodiment of the edge device shown in FIG. 5D.

FIGS. 5D and 5E illustrate perspective and right side views, respectively, of another embodiment of the edge device 102 having a camera skirt 514. The camera skirt 514 can block or filter out light emanating from an interior of the carrier vehicle 110 to prevent the lights from interfering with the video image sensors 208. For example, when the carrier vehicle 110 is a municipal bus, the interior of the municipal bus can be lit by artificial lights (e.g., fluorescent lights, LED lights, etc.) to ensure passenger safety. The camera skirt 514 can block or filter out such excess light to prevent the excess light from degrading the video footage captured by the video image sensors 208.

As shown in FIG. 5D, the camera skirt 514 can comprise a tapered or narrowed end and a wide flared end. The tapered end of the camera skirt 514 can be coupled to a front portion of the device housing 500. The camera skirt 514 can also comprise a skirt distal edge 516 defining the wide flared end. The skirt distal edge 516 can be configured to contact or press against one portion of the windshield or window of the carrier vehicle 110 when the edge device 102 is adhered or otherwise coupled to another portion of the windshield or window via the attachment arm 502.

As shown in FIG. 5D, the skirt distal edge 516 can be substantially elliptical-shaped or stadium-shaped. In other embodiments, the skirt distal edge 516 can be substantially shaped as a rectangle or oval. For example, at least part of the camera skirt 514 can be substantially shaped as a flattened frustoconic or a trapezoidal prism having rounded corners and edges.

FIG. 5D also illustrates that the combined field of view 512 of the video image sensors 208 housed within the embodiment of the edge device 102 shown in FIG. 5D can be less than 180 degrees. For example, the combined field of view 512 can be about 120 degrees or between about 90 degrees and 120 degrees.

Figure 6:
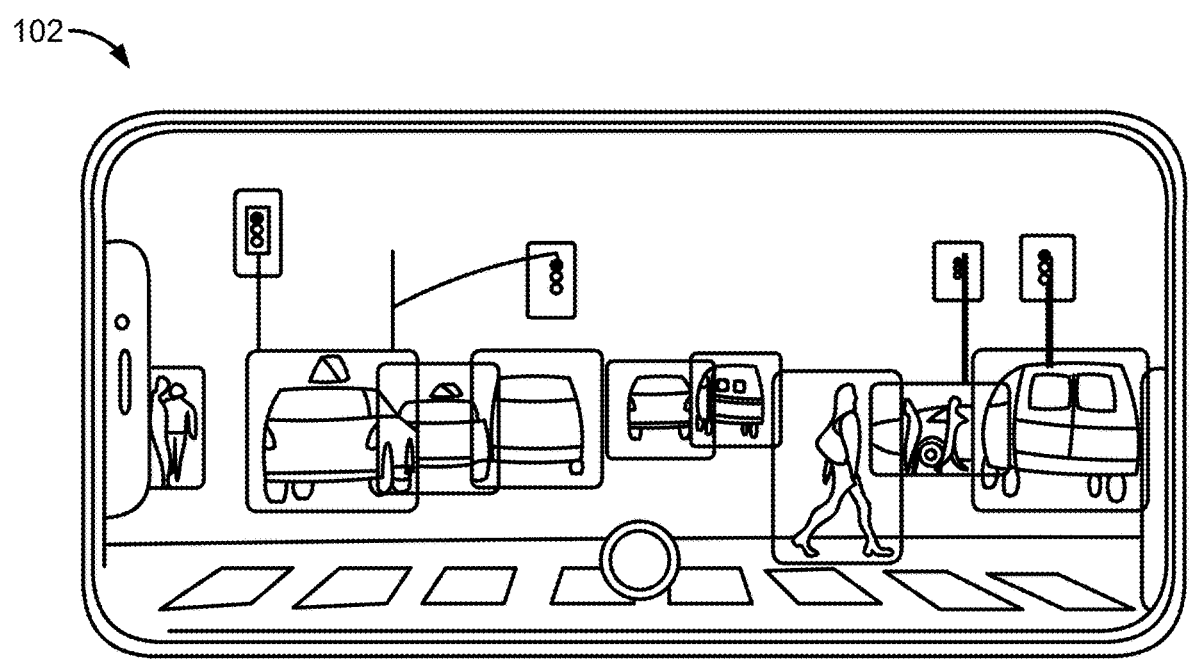
FIG. 6 illustrates another embodiment of an edge device implemented as a personal communication device such as a smartphone.

FIG. 6 illustrates an alternative embodiment of the edge device 102 where the edge device 102 is a personal communication device such as a smartphone or tablet computer. In this embodiment, the video image sensors 208 of the edge device 102 can be the built-in image sensors or cameras of the smartphone or tablet computer. Moreover, references to the one or more processors 200, the wireless communication modules 204, the positioning unit 210, the memory and storage units 202, and the IMUs 206 of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the windshield, window, dashboard, deck, mount, or body of the carrier vehicle 110.

Figure 7:
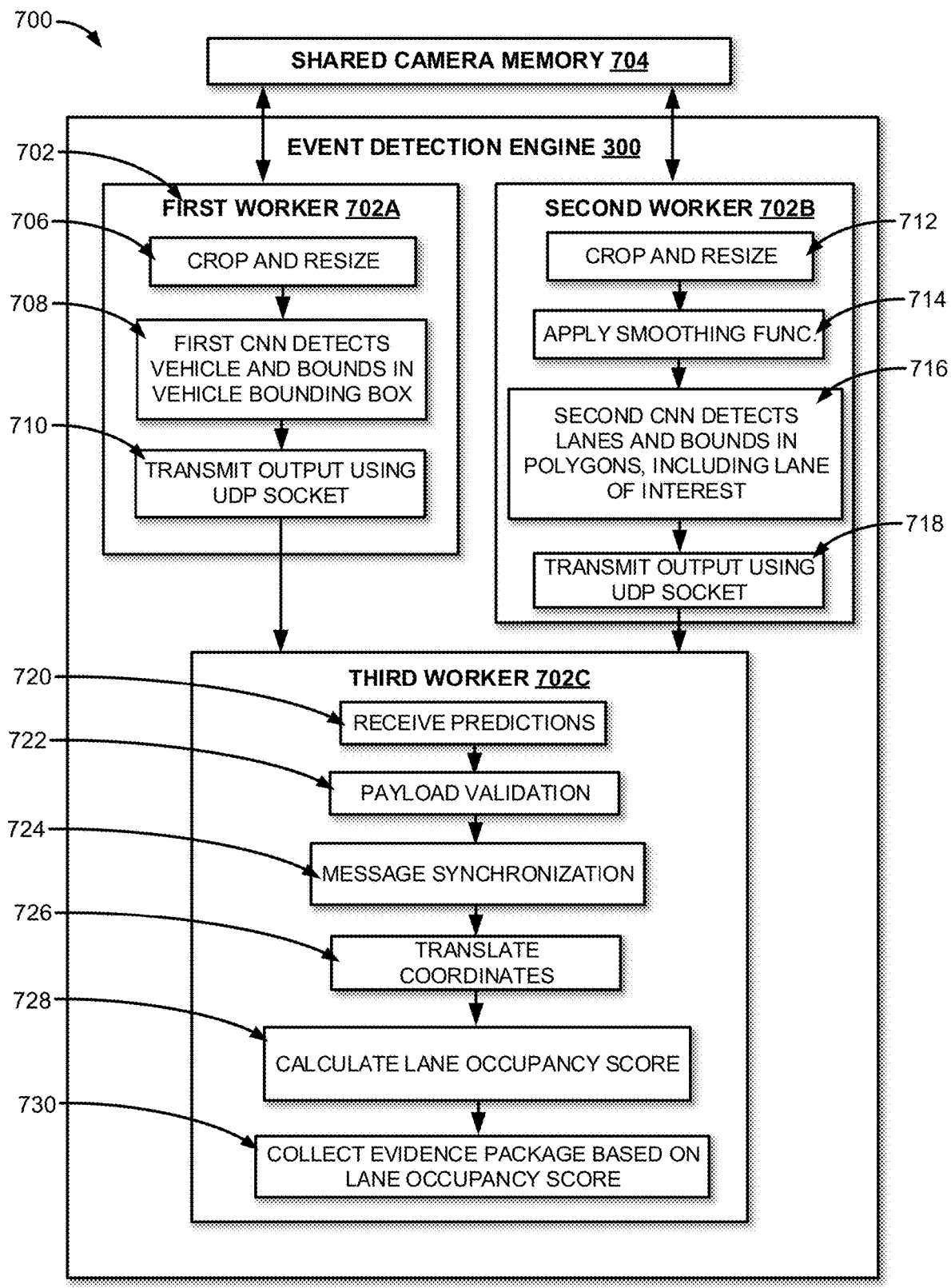
FIG. 7 illustrates one embodiment of a method of detecting a potential traffic violation using multiple convolutional neural networks.

FIG. 7 illustrates one embodiment of a method 700 for detecting a potential traffic violation. The method 700 can be undertaken by a plurality of workers 702 of the event detection engine 300.

The workers 702 can be software programs or modules dedicated to performing a specific set of tasks or operations. These tasks or operations can be part of a docker container created based on a docker container image 350. As previously discussed, the docker container images 350 can be transmitted over-the-air from a container registry 356 and/or a cloud storage node 358. Each worker 702 can be a software program or module dedicated to executing the tasks or operations within a docker container.

As shown in FIG. 7, the output from one worker 702 (e.g., the first worker 702A) can be transmitted to another worker (e.g., the third worker 702C) running on the same edge device 102. For example, the output or results (e.g., the inferences or predictions) provided by one worker can be transmitted to another worker using an inter-process communication protocol such as the user datagram protocol (UDP).

In some embodiments, the event detection engine 300 of each of the edge devices 102 can comprise at least a first worker 702A, a second worker 702B, and a third worker 702C. Although FIG. 7 illustrates the event detection engine 300 comprising three workers 702, it is contemplated by this disclosure that the event detection engine 300 can comprise four or more workers 702 or two workers 702.

As shown in FIG. 7, both the first worker 702A and the second worker 702B can retrieve or grab video frames from a shared camera memory 704. The shared camera memory 704 can be an onboard memory (e.g., non-volatile memory) of the edge device 102 for storing videos captured by the video image sensors 208. Since the video image sensors 208 are capturing approximately 30 video frames per second, the video frames are stored in the shared camera memory 704 prior to being analyzed by the first worker 702A or the second worker 702B. In some embodiments, the video frames can be grabbed using a video frame grab function such as the GStreamer tool.

As will be discussed in more detail in the following sections, the objective of the first worker 702A can be to detect objects of certain object classes (e.g., cars, trucks, buses, etc.) within a video frame and bound each of the objects with a vehicle bounding box 800 (see, e.g., FIG. 8). The objective of the second worker 702B can be to detect one or more lanes within the same video frame and bound the lanes in polygons 1008 (see, e.g., FIGS. 10, 11A, and 11B) including bounding a lane-of-interest (LOI) such as a restricted road area/lane 114 in a LOI polygon 1012. In alternative embodiments, the LOI can be a type of lane that is not restricted by a municipal/governmental restriction or another type of traffic restriction but a municipality or other type of governmental entity may be interested in the usage rate of such a lane.

The objective of the third worker 702C can be to detect whether a potential traffic violation has occurred by calculating a lane occupancy score 1200 (see, e.g., FIGS. 12A and 12B) using outputs (e.g., the vehicle bounding box and the LOI polygon 1012) produced and received from the first worker 702A and the second worker 702B.

FIG. 7 illustrates that the first worker 702A can crop and resize a video frame retrieved from the shared camera memory 704 in operation 706. The first worker 702A can crop and resize the video frame to optimize the video frame for analysis by one or more deep learning models or convolutional neural networks running on the edge device 102. For example, the first worker 702A can crop and resize the video frame to optimize the video frame for the first convolutional neural network 314 running on the edge device 102.

In one embodiment, the first worker 702A can crop and resize the video frame to match the pixel width and height of the training video frames used to train the first convolutional neural network 314. For example, the first worker 702A can crop and resize the video frame such that the aspect ratio of the video frame matches the aspect ratio of the training video frames.

As a more specific example, the video frames captured by the video image sensors 208 can have an aspect ratio of 1920×1080. When the event detection engine 300 is configured to determine traffic lane violations, the first worker 702A can be programmed to crop the video frames such that vehicles and roadways with lanes are retained but other objects or landmarks (e.g., sidewalks, pedestrians, building façades) are cropped out.

When the first convolutional neural network 314 is the DetectNet deep neural network, the first worker 702A can crop and resize the video frames such that the aspect ratio of the video frames is about 500×500 (corresponding to the pixel height and width of the training video frames used by the DetectNet deep neural network).

The method 700 can also comprise detecting a vehicle 112 from the video frame and bounding the vehicle 112 shown in the video frame with a vehicle bounding box 800 in operation 708. The first worker 702A can be programmed to pass the video frame to the first convolutional neural network 314 to obtain an object class 802, a confidence score 804 for the object class detected, and a set of coordinates for the vehicle bounding box 800 (see, e.g., FIG. 8).

In some embodiments, the first convolutional neural network 314 can be configured such that only certain vehicle-related objects are supported by the first convolutional neural network 314. For example, the first convolutional neural network 314 can be configured such that the object classes 802 supported only consist of cars, trucks, and buses. In other embodiments, the first convolutional neural network 314 can be configured such that the object classes 802 supported also include bicycles, scooters, and other types of wheeled mobility vehicles. In other embodiments, the first convolutional neural network 314 can be configured such that the object classes 802 supported also comprise non-vehicles classes such as pedestrians, landmarks, street signs, fire hydrants, bus stops, and building façades.

In certain embodiments, the first convolutional neural network 314 can be designed to detect up to 60 objects per video frame. Although the first convolutional neural network 314 can be designed to accommodate numerous object classes 802, one advantage of limiting the number of object classes 802 is to reduce the computational load on the processors of the edge device 102, shorten the training time of the neural network, and make the neural network more efficient.

The first convolutional neural network 314 can be a convolutional neural network comprising a plurality of convolutional layers and fully connected layers trained for object detection (and, in particular, vehicle detection). In one embodiment, the first convolutional neural network 314 can be a modified instance of the DetectNet deep neural network.

In other embodiments, the first convolutional neural network 314 can be the You Only Look Once Lite (YOLO Lite) object detection model. In some embodiments, the first convolutional neural network 314 can also identify certain attributes of the detected objects. For example, the first convolutional neural network 314 can identify a set of attributes of an object identified as a car such as the color of the car, the make and model of the car, and the car type (e.g., whether the vehicle is a personal vehicle or a public service vehicle).

The first convolutional neural network 314 can be trained, at least in part, from video frames of videos captured by the edge device 102 or other edge devices 102 deployed in the same municipality or coupled to other carrier vehicles 110 in the same carrier fleet. The first convolutional neural network 314 can be trained, at least in part, from video frames of videos captured by the edge device 102 or other edge devices at an earlier point in time. Moreover, the first convolutional neural network 314 can be trained, at least in part, from video frames from one or more open-sourced training sets or datasets.

As previously discussed, the first worker 702A can obtain a confidence score 804 from the first convolutional neural network 314. The confidence score 804 can be between 0 and 1.0. The first worker 702A can be programmed to not apply a vehicle bounding box to a vehicle if the confidence score 804 of the detection is below a preset confidence threshold. For example, the confidence threshold can be set at between 0.65 and 0.90 (e.g., at 0.70). The confidence threshold can be adjusted based on an environmental condition (e.g., a lighting condition), a location, a time-of-day, a day-of-the-week, or a combination thereof.

As previously discussed, the first worker 702A can also obtain a set of coordinates for the vehicle bounding box 800. The coordinates can be coordinates of corners of the vehicle bounding box 800. For example, the coordinates for the vehicle bounding box 800 can be x- and y-coordinates for an upper left corner and a lower right corner of the vehicle bounding box 800. In other embodiments, the coordinates for the vehicle bounding box 800 can be x- and y-coordinates of all four corners or the upper right corner and the lower left corner of the vehicle bounding box 800.

In some embodiments, the vehicle bounding box 800 can bound the entire two-dimensional (2D) image of the vehicle captured in the video frame. In other embodiments, the vehicle bounding box 800 can bound at least part of the 2D image of the vehicle captured in the video frame such as a majority of the pixels making up the 2D image of the vehicle.

The method 700 can further comprise transmitting the outputs produced by the first worker 702A and/or the first convolutional neural network 314 to a third worker 702C in operation 710. In some embodiments, the outputs produced by the first worker 702A and/or the first convolutional neural network 315 can comprise coordinates of the vehicle bounding box 800 and the object class 802 of the object detected (see, e.g., FIG. 8). The outputs produced by the first worker 702A and/or the first convolutional neural network 314 can be packaged into UDP packets and transmitted using UDP sockets to the third worker 702C.

In other embodiments, the outputs produced by the first worker 702A and/or the first convolutional neural network 314 can be transmitted to the third worker 702C using another network communication protocol such as a remote procedure call (RPC) communication protocol.

FIG. 7 illustrates that the second worker 702B can crop and resize a video frame retrieved from the shared camera memory 704 in operation 712. In some embodiments, the video frame retrieved by the second worker 702B can be the same as the video frame retrieved by the first worker 702A.

In other embodiments, the video frame retrieved by the second worker 702B can be a different video frame from the video frame retrieved by the first worker 702A. For example, the video frame can be captured at a different point in time than the video frame retrieved by the first worker 702A (e.g., several seconds or milliseconds before or after). In all such embodiments, one or more vehicles and lanes (see, e.g., FIGS. 10, 11A, and 11B) should be visible in the video frame.

The second worker 702B can crop and resize the video frame to optimize the video frame for analysis by one or more deep learning models or convolutional neural networks running on the edge device 102. For example, the second worker 702A can crop and resize the video frame to optimize the video frame for the second convolutional neural network 315.

In one embodiment, the second worker 702A can crop and resize the video frame to match the pixel width and height of the training video frames used to train the second convolutional neural network 315. For example, the second worker 702B can crop and resize the video frame such that the aspect ratio of the video frame matches the aspect ratio of the training video frames.

As a more specific example, the video frames captured by the video image sensors 208 can have an aspect ratio of 1920×1080. The second worker 702B can be programmed to crop the video frames such that vehicles and lanes are retained but other objects or landmarks (e.g., sidewalks, pedestrians, building façades) are cropped out.

When the second convolutional neural network 315 is the Segnet deep neural network, the second worker 702B can crop and resize the video frames such that the aspect ratio of the video frames is about 752×160 (corresponding to the pixel height and width of the training video frames used by the Segnet deep neural network).

When cropping the video frame, the method 700 can further comprise an additional step of determining whether a vanishing point 1010 (see, e.g., FIGS. 10, 11A, and 11B) is present within the video frame. The vanishing point 1010 can be one point or region in the video frame where distal or terminal ends of the lanes shown in the video frame converge into the point or region. If the vanishing point 1010 is not detected by the second worker 702B, a cropping parameter (e.g., a pixel height) can be adjusted until the vanishing point 1010 is detected. Alternatively, one or more video image sensors 208 on the edge device 102 can be physically adjusted (for example, as part of an initial calibration routine) until the vanishing point 1010 is shown in the video frames captured by the video image sensors 208. Adjusting the cropping parameters or the video image sensors 208 until a vanishing point 1010 is detected in the video frame can be part of a calibration procedure that I run before deploying the edge devices 102 in the field.

The vanishing point 1010 can be used to approximate the sizes of lanes detected by the second worker 702B. For example, the vanishing point 1010 can be used to detect when one or more of the lanes within a video frame are obstructed by an object (e.g., a bus, car, truck, or another type of vehicle). The vanishing point 1010 will be discussed in more detail in later sections.

The method 700 can further comprise applying a noise smoothing operation to the video frame in operation 714. The noise smoothing operation can reduce noise in the cropped and resized video frame. The noise smoothing operation can be applied to the video frame containing the one or more lanes prior to the step of bounding the one or more lanes using polygons 1008. For example, the noise smoothing operation can blur out or discard unnecessary details contained within the video frame. In some embodiments, the noise smoothing operation can be an exponentially weighted moving average (EWMA) smoothing operation.

In other embodiments, the noise smoothing operation can be a nearest neighbor image smoothing or scaling operation. In further embodiments, the noise smoothing operation can be a mean filtering image smoothing operation.

The method 700 can also comprise passing the processed video frame (i.e., the cropped, resized, and smoothed video frame) to the second convolutional neural network 315 to detect and bound lanes captured in the video frame in operation 716. The second convolutional neural network 315 can bound the lanes in a plurality of polygons. The second convolutional neural network 315 can be a convolutional neural network trained specifically for lane detection.

Figure 9:
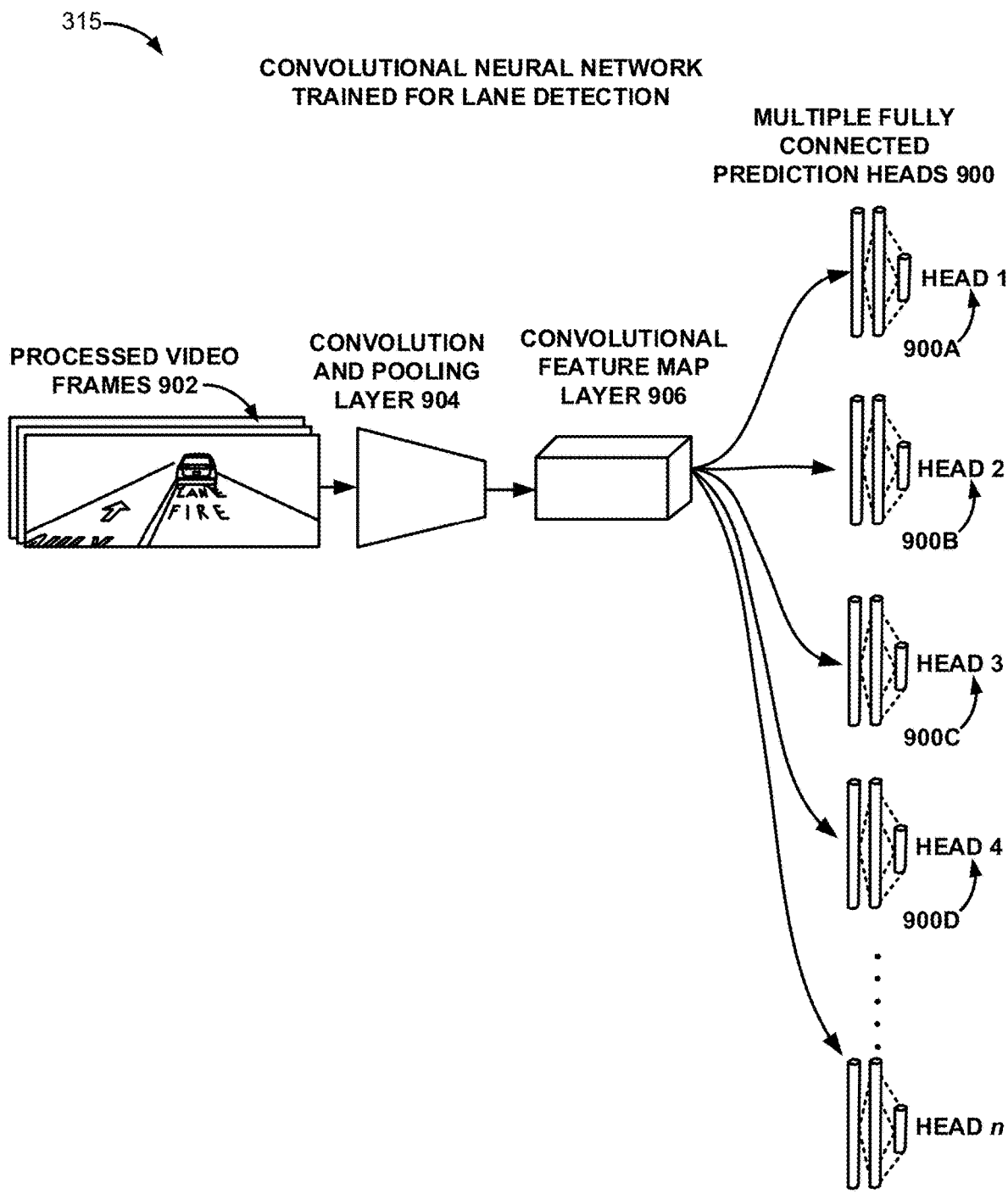
FIG. 9 illustrates one embodiment of a multi-headed convolutional neural network trained for lane detection.

In some embodiments, the second convolutional neural network 315 can be a multi-headed convolutional neural network comprising a plurality of prediction heads 900 (see, e.g., FIG. 9). For example, the second convolutional neural network 315 can be a modified instance of the Segnet convolutional neural network.

Each of the heads 900 of the second convolutional neural network 315 can be configured to detect a specific type of lane or lane marking(s). At least one of the lanes detected by the second convolutional neural network 315 can be a restricted lane 114 (e.g., a bus lane, fire lane, bike lane, etc.). The restricted lane 114 can be identified by the second convolutional neural network 315 and a polygon 1008 can be used to bound the restricted lane 114. Lane bounding using polygons will be discussed in more detail in later sections.

The method 700 can further comprise transmitting the outputs produced by the second worker 702B and/or the second convolutional neural network 315 to a third worker 702C in operation 718. In some embodiments, the outputs produced by the second worker 702B and/or the second convolutional neural network 315 can be coordinates of the polygons 1008 including coordinates of a LOI polygon 1012 (see, e.g., FIGS. 12A and 12B). As shown in FIG. 7, the outputs produced by the second worker 702B and/or the second convolutional network 315 can be packaged into UDP packets and transmitted using UDP sockets to the third worker 702C.

In other embodiments, the outputs produced by the second worker 702B and/or the second convolutional neural network 315 can be transmitted to the third worker 702C using another network communication protocol such as an RPC communication protocol.

As shown in FIG. 7, the third worker 702C can receive the outputs/results produced by the first worker 702A and the second worker 702B in operation 720. The third worker 702C can receive the outputs/results as UDP packets received over UDP sockets. The applicant discovered that inter-process communication times between workers 702 were reduced when UDP sockets were used over other communication protocols.

The outputs or results received from the first worker 702A can be in the form of predictions or detections made by the first convolutional neural network 314 (e.g., a DetectNet prediction) of the objects captured in the video frame that fit a supported object class 802 (e.g., car, truck, or bus) and the coordinates of the vehicle bounding boxes 800 bounding such objects. The outputs or results received from the second worker 702B can be in the form of predictions made by the second convolutional neural network 315 (e.g., a Segnet prediction) of the lanes captured in the video frame and the coordinates of polygons 1008 bounding such lanes including the coordinates of at least one LOI polygon 1012.

The method 700 can further comprise validating the payloads of UDP packets received from the first worker 702A and the second worker 702B in operation 722. The payloads can be validated or checked using a payload verification procedure such as a payload checksum verification algorithm. This is to ensure the packets received containing the predictions were not corrupted during transmission.

The method 700 can also comprise the third worker 702C synchronizing the payloads or messages received from the first worker 702A and the second worker 702B in operation 724. Synchronizing the payloads or messages can comprise checks or verifications on the predictions or data contained in such payloads or messages such that any comparison or further processing of such predictions or data is only performed if the predictions or data concern objects or lanes in the same video frame (i.e., the predictions or coordinates calculated are not generated from different video frames captured at significantly different points in time).

The method 700 can further comprise translating the coordinates of the vehicle bounding box 800 and the coordinates of the polygons 1008 (including the coordinates of the LOI polygon 1012) into a uniform coordinate domain in operation 726. Since the same video frame was cropped and resized differently by the first worker 702A (e.g., cropped and resized to an aspect ratio of 500×500 from an original aspect ratio of 1920×1080) and the second worker 702B (e.g., cropped and resized to an aspect ratio of 752×160 from an original aspect ratio of 1920×1080) to suit the needs of their respective convolutional neural networks, the pixel coordinates of pixels used to represent the vehicle bounding box 800 and the polygons 1008 must be translated into a shared coordinate domain or back to the coordinate domain of the original video frame (before the video frame was cropped or resized). This is to ensure that any subsequent comparison of the relative positions of boxes and polygons are done in one uniform coordinate domain.

The method 700 can also comprise calculating a lane occupancy score 1200 (see, e.g., FIGS. 12A and 12B) based in part on the translated coordinates of the vehicle bounding box 800 and the LOI polygon 1012 in operation 728. In some embodiments, the lane occupancy score 1200 can be a number between 0 and 1. The lane occupancy score 1200 can be calculated using one or more heuristics.

For example, the third worker 702C can calculate the lane occupancy score 1200 using a lane occupancy heuristic. The lane occupancy heuristic can comprise the steps of masking or filling in an area within the LOI polygon 1012 with certain pixels. The third worker 702C can then determine a pixel intensity value associated with each pixel within at least part of the vehicle bounding box 800. The pixel intensity value can range between 0 and 1 with 1 being a high degree of likelihood that the pixel is located within the LOI polygon 1012 and with 0 being a high degree of likelihood that the pixel is not located within the LOI polygon 1012. The lane occupancy score 1200 can be calculated by taking an average of the pixel intensity values of all pixels within at least part of the vehicle bounding box 800. Calculating the lane occupancy score 1200 will be discussed in more detail in later sections.

The method 700 can further comprise detecting that a potential traffic violation has occurred when the lane occupancy score 1200 exceeds a predetermined threshold value. The third worker 702C can then generate an evidence package (e.g., the evidence package 316) when the lane occupancy score 1200 exceeds a predetermined threshold value in operation 730.

In some embodiments, the evidence package can comprise the video frame or other video frames captured by the video image sensors 208, the positioning data 122 obtained by the positioning unit 210 of the edge device 102, certain timestamps documenting when the video frame was captured, a set of vehicle attributes concerning the vehicle 112, and an alphanumeric string representing a license plate of the vehicle 112. The evidence package can be prepared by the third worker 702C or another worker on the edge device 102 to be sent to the server 104 or a third-party computing device/resource or client device 130.

One technical problem faced by the applicants is how to efficiently and effectively provide training data or updates to the applications and deep learning models (e.g., the first convolutional neural network 314 and the second convolutional neural network 315) running on an edge device 102 without the updates slowing down the entire event detection engine 300 or crashing the entire event detection engine 300 in the case of a failure. One technical solution discovered and developed by the applicants is the multiple-worker architecture disclosed herein where the event detection engine 300 comprises multiple workers with each worker executing a part of the detection method. In the system developed by the applicants, each of the deep learning models (e.g., the first convolutional neural network 314 or the second convolutional neural network 315) within such workers can be updated separately via separate docker container images received from a container registry 356 or a cloud storage node 358.

Figure 8:
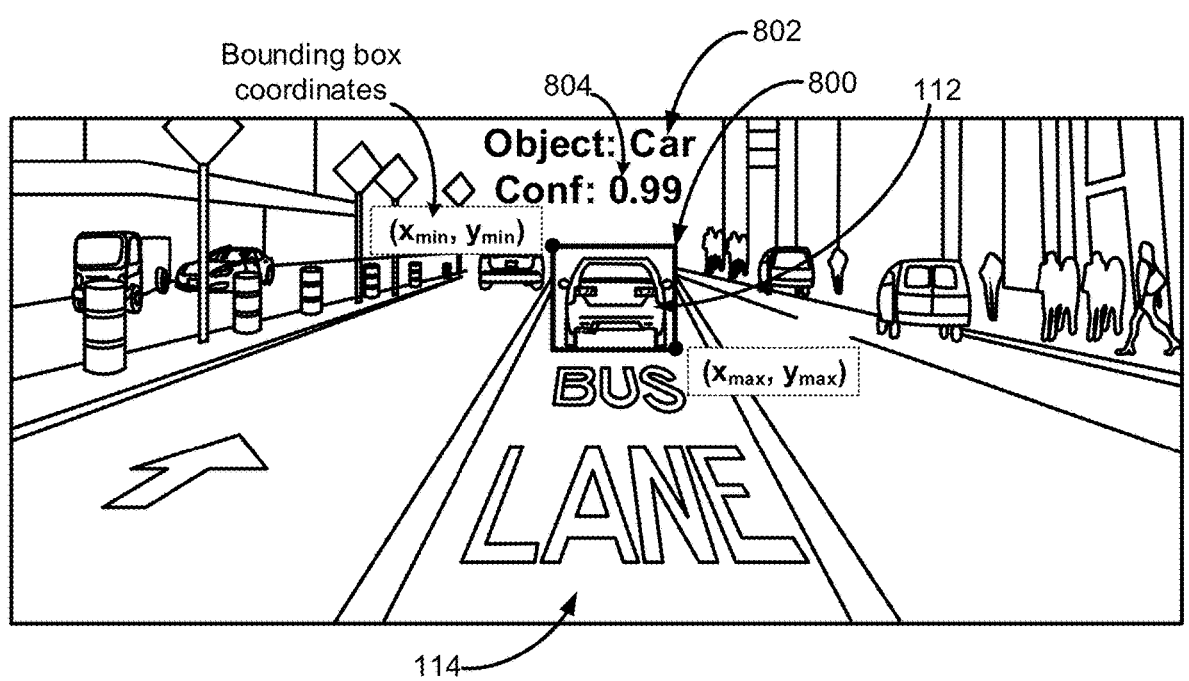
FIG. 8 illustrates a video frame showing a vehicle bounded by a vehicle bounding box.

FIG. 8 illustrates a visual representation of a vehicle 112 being bound by a vehicle bounding box 800. As previously discussed, the first worker 702A can pass video frames in real-time (or near real-time) to the first convolutional neural network 314 to obtain an object class 802 (e.g., a car, a truck, or a bus), a confidence score 804 (e.g., between 0 and 1), and a set of coordinates for the vehicle bounding box 800.

In some embodiments, the first convolutional neural network 314 can be designed to automatically output the object class 802 (e.g., a car, a truck, or a bus), the confidence score 804 (e.g., between 0 and 1), and the set of coordinates for the vehicle bounding box 800 with only one forward pass of the video frame through the neural network.

FIG. 8 also illustrates that the video frame can capture the vehicle 112 driving, parked, or stopped in a restricted lane 114. In some embodiments, the restricted lane 114 can be a bus lane, a bike lane, or any other type of restricted roadway. The restricted lane 114 can be marked by certain insignia, text, nearby signage, road or curb coloration, or a combination thereof. In other embodiments, the restricted lane 114 can be designated or indicated in a private or public database (e.g., a municipal GIS database) accessible by the edge device 102, the server 104, or a combination thereof.

As previously discussed, the second worker 702B can be programmed to analyze the same video frame and recognize the restricted lane 114 from the video frame. The second worker 702B can be programmed to undertake several operations to bound the restricted lane 114 in a polygon 1008. A third worker 702C can then be used to detect a potential traffic violation based on a degree of overlap between at least part of the vehicle bounding box 800 and at least part of the LOI polygon 1012 representing the restricted lane 114. More details will be provided in the following sections concerning recognizing the restricted lane 114 and detecting the potential traffic violation.

Although FIG. 8 illustrates only one instance of a vehicle bounding box 800, it is contemplated by this disclosure that multiple vehicles can be bounded by vehicle bounding boxes 800 in the same video frame. Moreover, although FIG. 8 illustrates a visual representation of the vehicle bounding box 800, it should be understood by one of ordinary skill in the art that the coordinates of the vehicle bounding boxes 800 can be used as inputs for further processing by another worker 702 or stored in a database without the actual vehicle bounding box 800 being visualized.

FIG. 9 illustrates a schematic representation of one embodiment of the second convolutional neural network 315. As previously discussed, the second convolutional neural network 315 can be a multi-headed convolutional neural network trained for lane detection.

As shown in FIG. 9, the second convolutional neural network 315 can comprise a plurality of fully-connected prediction heads 900 operating on top of several shared layers. For example, the prediction heads 900 can comprise a first head 900A, a second head 900B, a third head 900C, and a fourth head 900D. The first head 900A, the second head 900B, the third head 900C, and the fourth head 900D can share a common stack of network layers including at least a convolution and pooling layer 904 and a convolutional feature map layer 906.

The convolution and pooling layer 904 can be configured to receive as inputs video frames 902 that have been cropped, resized, and/or smoothed by pre-processing operations undertaken by the second worker 702B. The convolution and pooling layer 904 can then pool certain raw pixel data and sub-sample certain raw pixel regions of the video frames 902 to reduce the size of the data to be handled by the subsequent layers of the network.

The convolutional feature map layer 906 can extract certain essential or relevant image features from the pooled image data received from the convolution and pooling layer 904 and feed the essential image features extracted to the plurality of prediction heads 900.

The prediction heads 900, including the first head 900A, the second head 900B, the third head 900C, and the fourth head 900D, can then make their own predictions or detections concerning different types of lanes captured by the video frames 902. By designing the second convolutional neural network 315 in this manner (i.e., multiple prediction heads 900 sharing the same underlying layers), the second worker 702B can ensure that the predictions made by the various prediction heads 900 are not affected by any differences in the way the image data is processed by the underlying layers.

Although reference is made in this disclosure to four prediction heads 900, it is contemplated by this disclosure that the second convolutional neural network 315 can comprise five or more prediction heads 900 with at least some of the heads 900 detecting different types of lanes. Moreover, it is contemplated by this disclosure that the object detection engine 300 can be configured such that the object detection workflow of the first convolutional neural network 314 is integrated with the second convolutional neural network 315 such that the object detection steps are conducted by an additional head 900 of a singular neural network.

Figure 10:
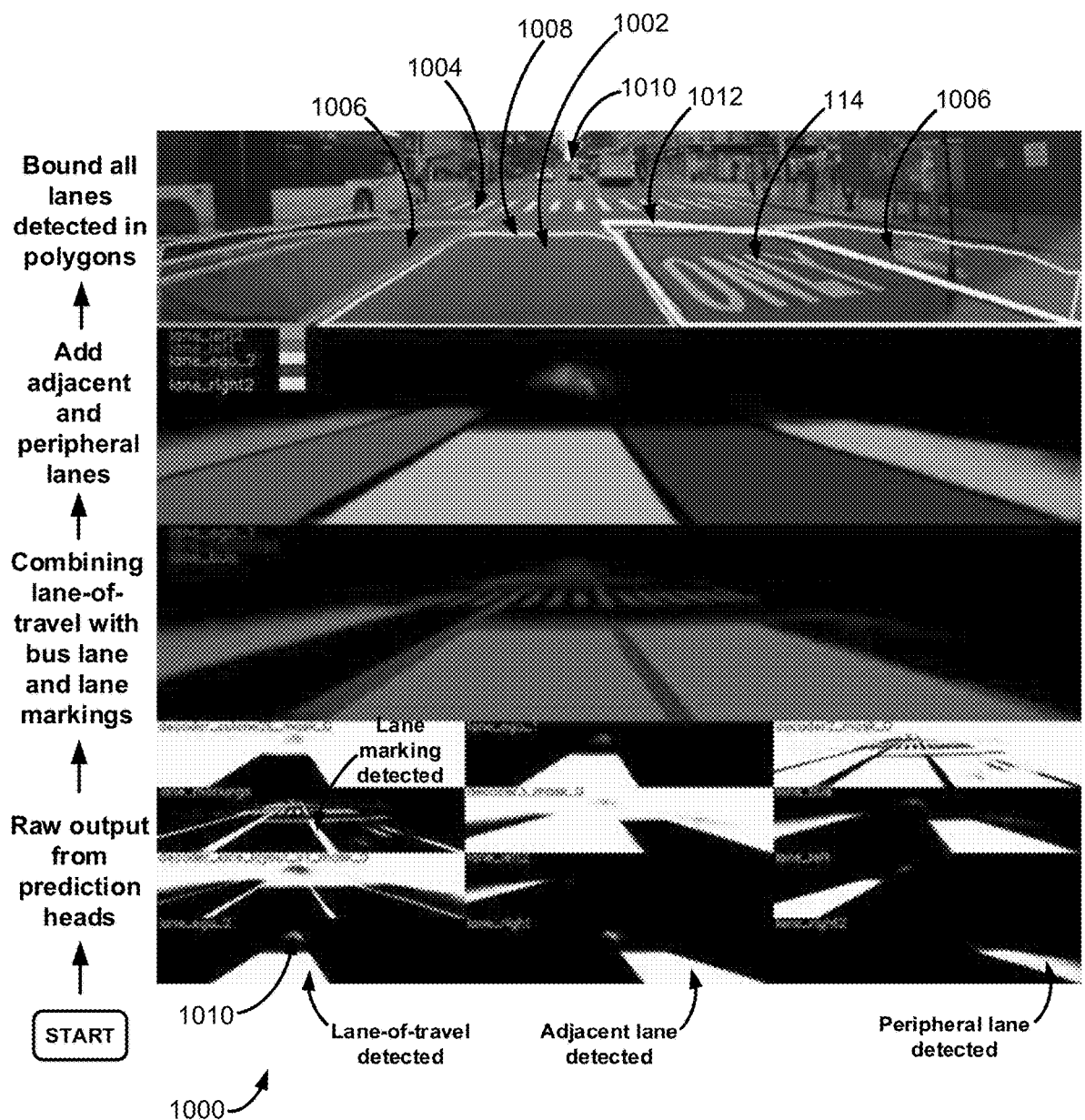
FIG. 10 illustrates visualizations of detection outputs of the multi-headed convolutional neural network including certain raw detection outputs.
Figure 11A:
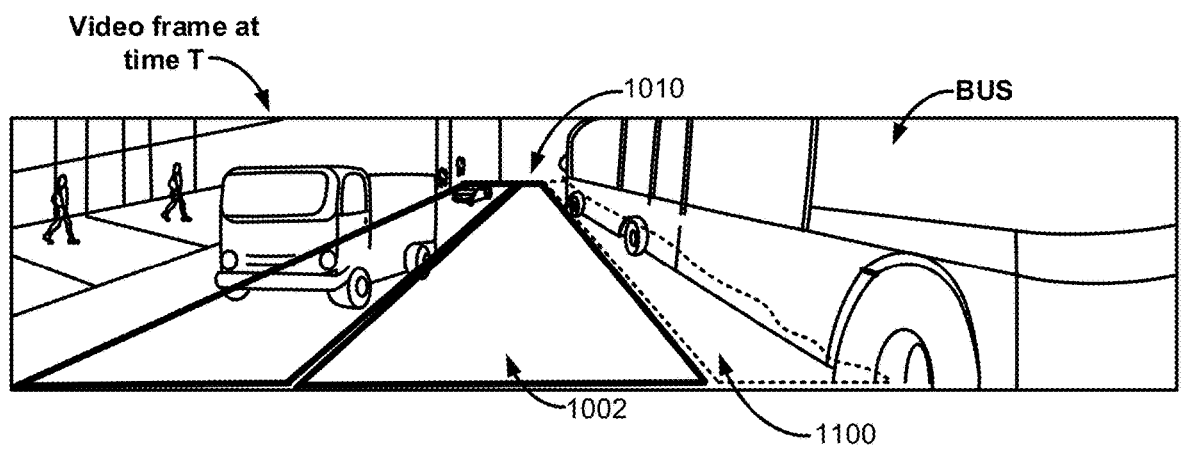
FIGS. 11A and 11B illustrate one embodiment of a method of conducting lane detection when at least part of the lane is obstructed by a vehicle or object.
Figure 11B:
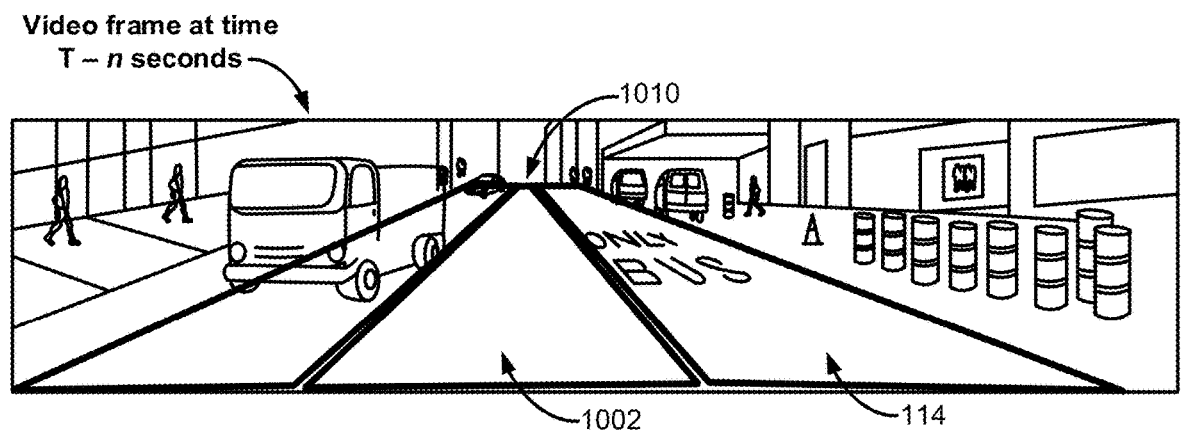

In some embodiments, the first head 900A of the second convolutional neural network 315 can be trained to detect a lane-of-travel 1002 (see, e.g., FIGS. 10, 11A, and 11B). The lane-of-travel 1002 can be the lane currently used by the carrier vehicle 110 carrying the edge device 102 used to capture the video frames currently being analyzed. The lane-of-travel 1002 can be detected using a position of the lane relative to adjacent lanes and the rest of the video frame. The first head 900A can be trained using an open-source dataset designed specifically for lane detection. For example, the dataset can be the CULane dataset. In other embodiments, the first head 900A can also be trained using video frames obtained from deployed edge devices 102.

In these and other embodiments, the second head 900B of the second convolutional neural network 315 can be trained to detect lane markings 1004 (see, e.g., FIGS. 10, 11A, and 11B). For example, the lane markings 1004 can comprise lane lines, text markings, markings indicating a crosswalk, markings indicating turn lanes, dividing line markings, or a combination thereof.

The second head 900B can be trained using an open-source dataset designed specifically for detecting lane markings 1004. For example, the dataset can be the Apolloscape dataset. In other embodiments, the second head 900B can also be trained using video frames obtained from deployed edge devices 102.

The third head 900C of the second convolutional neural network 315 can be trained to detect the restricted lane 114 (see, e.g., FIGS. 8, 10, 11A, and 11B). In some embodiments, the restricted lane 114 can be a bus lane. In other embodiments, the restricted lane 114 can be a bike lane, a fire lane, a toll lane, or a combination thereof. The third head 900C can detect the restricted lane 114 based on a color of the lane, a specific type of lane marking, a lane position, or a combination thereof. The third head 900C can be trained using video frames obtained from deployed edge devices 102. In other embodiments, the third head 900C can also be trained using training data (e.g., video frames) obtained from an open-source dataset.

The fourth head 900D of the second convolutional neural network 315 can be trained to detect one or more adjacent or peripheral lanes 1006 (see, e.g., FIGS. 10, 11A, and 11B). In some embodiments, the adjacent or peripheral lanes 1006 can be lanes immediately adjacent to the lane-of-travel 1002 or lanes further adjoining the immediately adjacent lanes. In certain embodiments, the fourth head 900D can detect the adjacent or peripheral lanes 1006 based on a position of such lanes relative to the lane-of-travel 1002. The fourth head 900D can be trained using video frames obtained from deployed edge devices 102. In other embodiments, the fourth head 900D can also be trained using training data (e.g., video frames) obtained from an open-source dataset.

In some embodiments, the training data (e.g., video frames) used to train the prediction heads 900 (any of the first head 900A, the second head 900B, the third head 900C, or the fourth head 900D) can be annotated using a multi-label classification scheme. For example, the same video frame can be labeled with multiple labels (e.g., annotations indicating a bus lane, a lane-of-travel, adjacent/peripheral lanes, crosswalks, etc.) such that the video frame can be used to train multiple or all of the prediction heads 900.

FIG. 10 illustrates visualizations of detection outputs of the multi-headed second convolutional neural network 315 including certain raw detection outputs 1000. FIG. 10 shows the raw detection outputs 1000 of the plurality of prediction heads 900 at the bottom of the stack of images.

The white-colored portions of the video frame images representing the raw detection outputs 1000 can indicate where a lane or lane marking 1004 has been detected by the prediction heads 900. For example, a white-colored lane marking 1004 can indicate a positive detection by the second head 900B. Also, for example, a white-colored middle lane can indicate a positive detection of the lane-of-travel 1002 by the first head 900A.

The raw detection outputs 1000 from the various prediction heads 900 can then be combined to re-create the lanes shown in the original video frame. In certain embodiments, the lane-of-travel 1002 can first be identified and the restricted lane 114 (e.g., bus lane) can then be identified relative to the lane-of-travel 1002. In some instances, the restricted lane 114 can be adjacent to the lane-of-travel 1002. In other instances, the restricted lane 114 can be the same as the lane-of-travel 1002 when the carrier vehicle 110 carrying the edge device 102 is actually driving in the restricted lane 114. One or more adjacent or peripheral lanes 1006 detected by the fourth head 900D can also be added to confirm or adjust the side boundaries of all lanes detected thus far. The lane markings 1004 detected by the second head 900B can also be overlaid on the lanes detected to establish or further cross-check the side and forward boundaries of the lanes detected.

All of the lanes detected can then be bound using polygons 1008 to indicate the boundaries of the lanes. The boundaries of such lanes can be determined by combining and reconciling the detection outputs from the various prediction heads 900 including all lanes and lane markings 1004 detected.

In some embodiments, the polygons 1008 can be quadrilaterals. More specifically, at least some of the polygons 1008 can be shaped substantially as trapezoids.

The top frame in FIG. 10 illustrates the polygons 1008 overlaid on the actual video frame fed into the multi-headed second convolutional neural network 315. As shown in FIG. 10, the vanishing point 1010 in the video frame can be used by at least some of the prediction heads 900 to make their initial raw detections of certain lanes. These raw detection outputs can then be refined as detection outputs from multiple prediction heads 900 are combined and/or reconciled with one another. For example, the boundaries of a detected lane can be adjusted based on the boundaries of other detected lanes adjacent to the detected lane. Moreover, a forward boundary of the detected lane can be determined based on certain lane markings 1004 (e.g., a pedestrian crosswalk) detected.

FIG. 10 also illustrates that at least one of the polygons 1008 can be a polygon 1008 bounding a lane-of-interest (LOI), also referred to as a LOI polygon 1012. In some embodiments, the LOI can be a restricted lane 114 such as a bus lane, bike lane, fire lane, or toll lane. In these embodiments, the LOI polygon 1012 can bound the bus lane, bike lane, fire lane, or toll lane.

One technical problem faced by the applicants is how to accurately detect a restricted lane on a roadway with multiple lanes when an edge device used to capture video of the multiple lanes can be driving on any one of the lanes on the roadway. One technical solution discovered by the applicants is the method and system disclosed herein where multiple prediction heads of a convolutional neural network are used to detect the multiple lanes where each head is assigned a different type of lane or lane feature. The multiple lanes include a lane-of-travel as well as the restricted lane and any adjacent or peripheral lanes. Output from all such prediction heads are then combined and reconciled with one another to arrive at a final prediction concerning the location of the lanes. The applicants also discovered that the approach disclosed herein produces more accurate predictions concerning the lanes shown in the video frames and the locations of such lanes than traditional computer vision techniques.

In addition to bounding the detected lanes in polygons 1008, the second worker 702B can also continuously check the size of the polygons 1008 against polygons 1008 calculated based on previous video frames (or video frames captured at an earlier point in time). This is necessary since lanes captured in video frames are often temporarily obstructed by vehicles driving in such lanes, which can adversely affect the accuracy of polygons 1008 calculated from such video frames.

FIGS. 11A and 11B illustrate a method of conducting lane detection when at least part of a lane is obstructed by a vehicle or object. For example, as shown in FIG. 11A, part of a lane adjacent to the lane-of-travel 1002 can be obstructed by a bus traveling in the lane. In this example, the obstructed lane can be a restricted lane 114 considered the LOI.

When a lane (such as the restricted lane 114) is obstructed, the shape of the lane detected by the second convolutional neural network 115 can be an irregular shape 1100 or shaped as a blob. To prevent the irregular shape 1100 or blob from being used to generate or update a lane polygon 1008, the second worker 702B can continuously perform a preliminary check on the shape of the lanes detected by approximating an area of the lanes detected by the second convolutional neural network 115.

For example, the second worker 702B can approximate the area of the lanes detected by using the coordinates of the vanishing point 1010 in the video frame as a vertex of an elongated triangle with the base of the detected lane serving as the base of the triangle. As a more specific example, the second worker 702B can generate the elongated triangle such that a width of the irregular shape 1100 is used to approximate a base of the elongated triangle. The second worker 702B can then compare the area of this particular elongated triangle against the area of another elongated triangle approximating the same lane calculated at an earlier point in time. For example, the second worker 702B can compare the area of this particular elongated triangle against the area of another elongated triangle calculated several seconds earlier of the same lane. If the difference in the areas of the two triangles are below a predetermined area threshold, the second worker 702B can continue to bound the detected lane in a polygon 1008. However, if the difference in the areas of the two triangles exceed a predetermined area threshold, the second worker 702B can discard the results of this particular lane detection and use the same lane detected in a previous video frame (e.g., a video frame captured several seconds before the present frame) to generate the polygon 1008. In this manner, the second worker 702B can ensure that the polygons 1008 calculated do not fluctuate extensively in size over short periods of time due to the lanes being obstructed by vehicles traveling in such lanes.

One technical problem faced by the applicants is how to accurately detect lanes from video frames in real-time or near real-time when such lanes are often obstructed by vehicles traveling in the lanes. One technical solution developed by the applicants is the method disclosed herein where a lane area is first approximated using a vanishing point captured in the video frame and the approximate lane area is compared against an approximate lane area calculated for the same lane at an earlier point in time (e.g., several seconds ago). If the differences in the lane areas exceed a predetermined area threshold, the same lane captured in a previous video frame can be used to generate the polygon of this lane.

FIGS. 12A and 12B illustrate one embodiment of a method of calculating a lane occupancy score 1200. In this embodiment, the lane occupancy score 1200 can be calculated based in part on the translated coordinates of the vehicle bounding box 800 and the LOI polygon 1012. As previously discussed, the translated coordinates of the vehicle bounding box 800 and the LOI polygon 1012 can be based on the same uniform coordinate domain (for example, a coordinate domain of the video frame originally captured).

As shown in FIGS. 12A and 12B, an upper portion of the vehicle bounding box 800 can be discarded or left unused such that only a lower portion of the vehicle bounding box 800 (also referred to as a lower bounding box 1202) remains. The applicants have discovered that a lane occupancy score 1200 can be accurately calculated using only the lower portion of the vehicle bounding box 800. Using only the lower portion of the vehicle bounding box 800 (also referred to herein as the lower bounding box 1202) saves processing time and speeds up the detection.

In some embodiments, the lower bounding box 1202 is a truncated version of the vehicle bounding box 800 including only the bottom 5% to 30% (e.g., 15%) of the vehicle bounding box 800. For example, the lower bounding box 1202 can be the bottom 15% of the vehicle bounding box 800.

As a more specific example, the lower bounding box 1202 can be a rectangular bounding box with a height dimension equal to between 5% to 30% of the height dimension of the vehicle bounding box 800 but with the same width dimension as the vehicle bounding box 800. As another example, the lower bounding box 1202 can be a rectangular bounding box with an area equivalent to between 5% to 30% of the total area of the vehicle bounding box 800. In all such examples, the lower bounding box 1202 can encompass the tires 1204 of the vehicle 112 captured in the video frame. Moreover, it should be understood by one of ordinary skill in the art that although the word "box" is used to refer to the vehicle bounding box 800 and the lower bounding box 1202, the height and width dimensions of such bounding "boxes" do not need to be equal.

The method of calculating the lane occupancy score 1200 can also comprise masking the LOI polygon 1012 such that the entire area within the LOI polygon 1012 is filled with pixels. For example, the pixels used to fill the area encompassed by the LOI polygon 1012 can be pixels of a certain color or intensity. In some embodiments, the color or intensity of the pixels can represent or correspond to a confidence level or confidence score (e.g., the confidence score 804) of a detection undertaken by the first worker 702A (from the first convolutional neural network 314), the second worker 702B (from the second convolutional neural network 315), or a combination thereof.

The method can further comprise determining a pixel intensity value associated with each pixel within the lower bounding box 1202. The pixel intensity value can be a decimal number between 0 and 1. In some embodiments, the pixel intensity value corresponds to a confidence score or confidence level provided by the second convolutional network 315 that the pixel is part of the LOI polygon 1012. Pixels within the lower bounding box 1202 that are located within a region that overlaps with the LOI polygon 1012 can have a pixel intensity value closer to 1. Pixels within the lower bounding box 1202 that are located within a region that does not overlap with the LOI polygon 1012 can have a pixel intensity value closer to 0. All other pixels including pixels in a border region between overlapping and non-overlapping regions can have a pixel intensity value in between 0 and 1.

For example, as shown in FIG. 12A, a vehicle can be stopped or traveling in a restricted lane that has been bounded by an LOI polygon 1012. The LOI polygon 1012 has been masked by filling in the area encompassed by the LOI polygon 1012 with pixels. A lower bounding box 1202 representing a lower portion of the vehicle bounding box 800 has been overlaid on the masked LOI polygon to represent the overlap between the two bounded regions.

FIG. 12A illustrates three pixels within the lower bounding box 1202 including a first pixel 1206A, a second pixel 1206B, and a third pixel 1206C. Based on the scenario shown in FIG. 12A, the first pixel 1206A is within an overlap region (shown as A1 in FIG. 12A), the second pixel 1206B is located on a border of the overlap region, and the third pixel 1206C is located in a non-overlapping region (shown as A2 in FIG. 12A). In this case, the first pixel 1206A can have a pixel intensity value of about 0.99 (for example, as provided by the second worker 702B), the second pixel 1206B can have a pixel intensity value of about 0.65 (as provided by the second worker 702B), and the third pixel 1206C can have a pixel intensity value of about 0.09 (also provided by the second worker 702B).

FIG. 12B illustrates an alternative scenario where a vehicle 112 is traveling or stopped in a lane adjacent to a restricted lane that has been bound by an LOI polygon 1012. In this scenario, the vehicle 112 is not actually in the restricted lane. Three pixels are also shown in FIG. 12B including a first pixel 1208A, a second pixel 1208B, and a third pixel 1208C. The first pixel 1208A is within a non-overlapping region (shown as A1 in FIG. 12B), the second pixel 1208B is located on a border of the non-overlapping region, and the third pixel 1208C is located in an overlap region (shown as A2 in FIG. 12B). In this case, the first pixel 1208A can have a pixel intensity value of about 0.09 (for example, as provided by the second worker 702B), the second pixel 1208B can have a pixel intensity value of about 0.25 (as provided by the second worker 702B), and the third pixel 1208C can have a pixel intensity value of about 0.79 (also provided by the second worker 702B).

With these pixel intensity values determined, a lane occupancy score 1200 can be calculated. The lane occupancy score 1200 can be calculated by taking an average of the pixel intensity values of all pixels within each of the lower bounding boxes 1202. The lane occupancy score 1200 can also be considered the mean mask intensity value of the portion of the LOI polygon 1012 within the lower bounding box 1202.

For example, the lane occupancy score 1200 can be calculated using Formula I below:

$$\text{Lane Occupancy Score} = \frac{\sum_{i=1}^{n} \text{Pixel Intensity Value}_i}{n} \quad \text{Formula I}$$

where n is the number of pixels within the lower portion of the vehicle bounding box (or lower bounding box 1202) and where the Pixel Intensity Value$_i$ is a confidence level or confidence score associated with each of the pixels within the LOI polygon 1012 relating to a likelihood that the pixel is depicting part of a lane-of-interest such as a restricted lane. The pixel intensity values can be provided by the second worker 702B using the second convolutional neural network 315.

The method can further comprise detecting a potential traffic violation when the lane occupancy score 1200 exceeds a predetermined threshold value. In some embodiments, the predetermined threshold value can be about 0.75 or 0.85, or a value between 0.75 and 0.85. In other embodiments, the predetermined threshold value can be between about 0.70 and 0.75 or between about 0.85 and 0.90.

Going back to the scenarios shown in FIGS. 12A and 12B, the lane occupancy score 1200 of the vehicle 112 shown in FIG. 12A can be calculated as approximately 0.89 while the lane occupancy score 1200 of the vehicle 112 shown in FIG. 12B can be calculated as approximately 0.19. In both cases, the predetermined threshold value for the lane occupancy score 1200 can be set at 0.75. With respect to the scenario shown in FIG. 12A, the third worker 702C of the event detection engine 300 can determine that a potential traffic violation has occurred and can begin to generate an evidence package to be sent to the server 104 or a third-party computing device/client device 130. With respect to the scenario shown in FIG. 12B, the third worker 702C can determine that a potential traffic violation has not occurred.

Figure 12C:
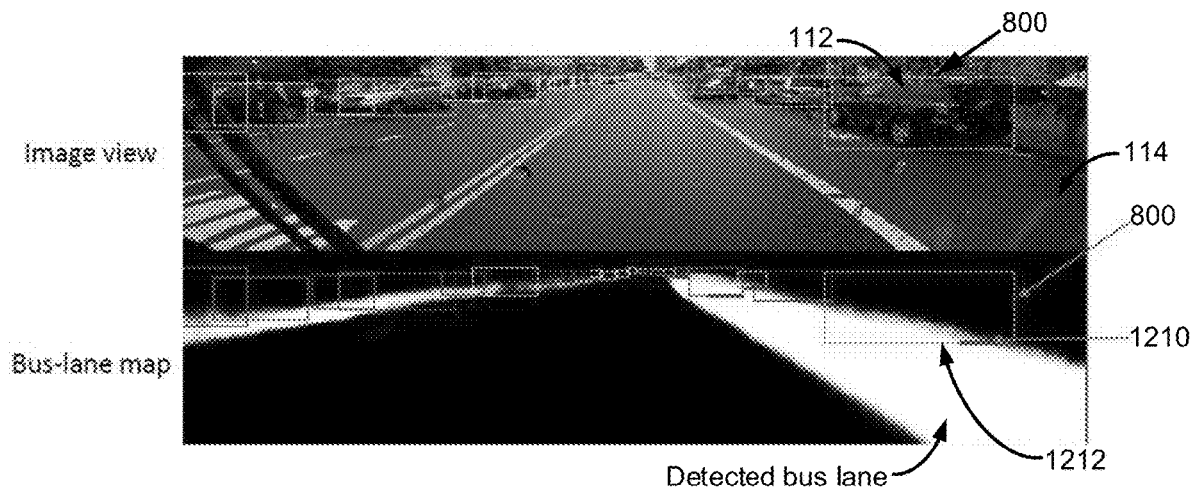
FIGS. 12C and 12D illustrate another embodiment of a method of calculating a lane occupancy score.
Figure 12D:
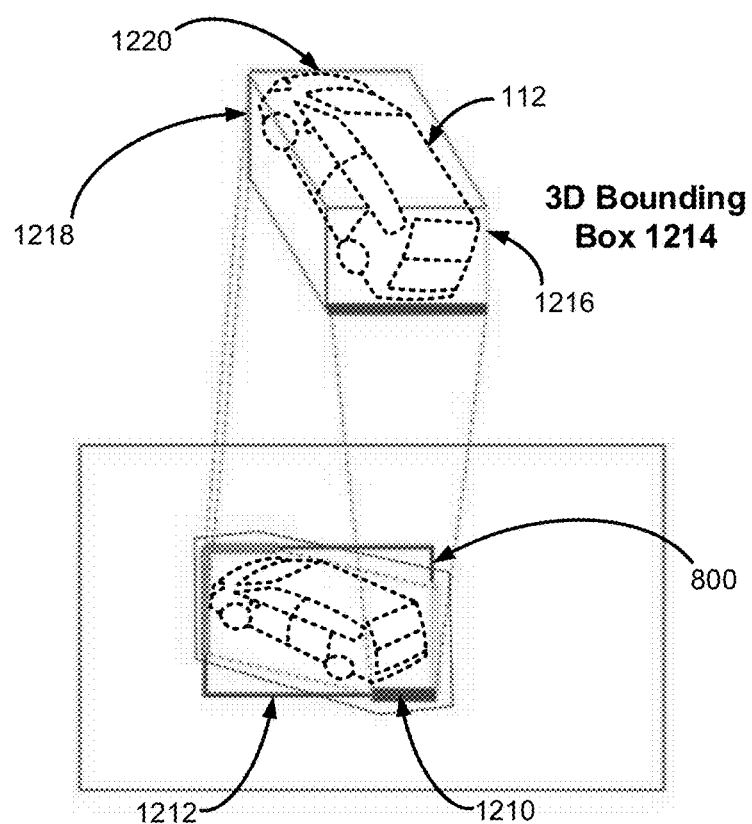

FIGS. 12C and 12D illustrate another embodiment of a method of calculating a lane occupancy score 1200 using a baseline segment 1210 along a lower side 1212 of the vehicle bounding box 800. As shown in FIG. 12C, the baseline segment 1210 along the lower side 1212 of the vehicle bounding box 800 can correspond to a road segment under a rear end of the vehicle.

In some embodiments, the baseline segment 1210 can be a line segment along the lower side 1212 of the vehicle bounding box 800 close to a lower right corner of the vehicle bounding box 800. The baseline segment 1210 can be considered "on the ground" such that the pixels making up the baseline segment 1210 can be compared against the LOI polygon 1012 by the second convolutional neural network 315.

The method can also comprise determining a length of the baseline segment 1210. The length of the baseline segment 1210 can be estimated based on the lengths of at least three edges of a three-dimensional (3D) bounding box 1214 bounding a contour or outline of the vehicle 112. The 3D bounding box 1214 can be generated using certain functions and/or tools from the computer vision library 312 (see, e.g., FIG. 3). For example, the three edges can be defined by a near edge 1216 representing a height of the 3D bounding box 1214, a first far edge 1218 also representing a height of the 3D bounding box 1214, and a second far edge 1220 representing a width of the 3D bounding box 1214. The 3D bounding box 1214 and its various edges (including the near edge 1216, the first far edge 1218, and the second far edge 1220) can be projected or mapped onto a two-dimensional (2D) space and the corresponding side segments of the now 2D bounding box can be used to calculate the length of the baseline segment 1210.

The method can further comprise masking the LOI polygon 1012 such that the entire area within the LOI polygon 1012 is filled with pixels. For example, the pixels used to fill the area encompassed by the LOI polygon 1012 can be pixels of a certain color or intensity.

The method can also comprise determining the pixel intensity value associated with each pixel along the baseline segment 1210. The pixel intensity value can represent a degree of overlap between the LOI polygon 1012 and the baseline segment 1210. The method can further comprise calculating a lane occupancy score by taking an average of the pixel intensity values of all pixels along the baseline segment 1210. A potential traffic violation can then be detected if the lane occupancy score exceeds a predetermined threshold value.

Figure 12E:
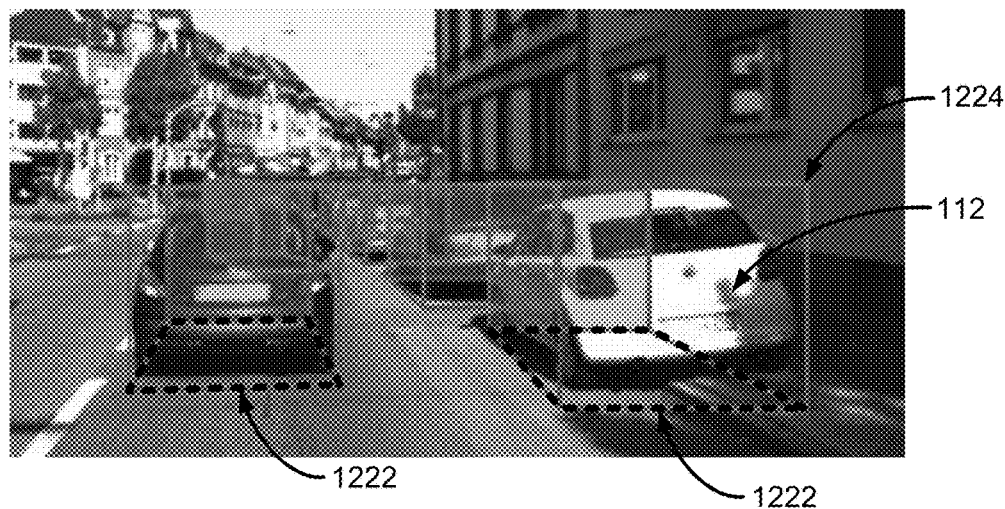
FIGS. 12E and 12F illustrate a further embodiment of a method of calculating a lane occupancy score.
Figure 12F:
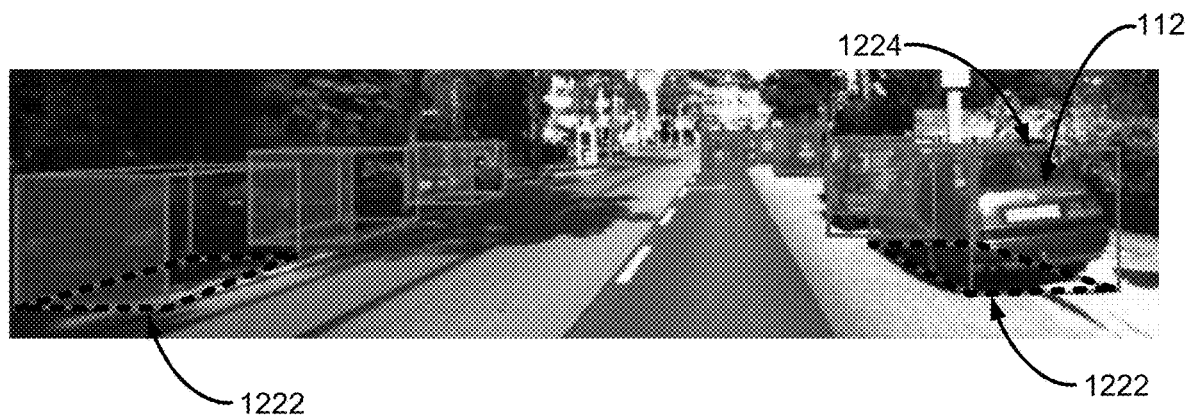

FIGS. 12E and 12F illustrate another embodiment of a method of calculating a lane occupancy score 1200 using a polygonal base 1222 serving as part of a 3D bounding box 1224 generated from the 2D vehicle bounding box 800. As shown in FIGS. 12E and 12F, the polygonal base 1222 can be a bottom face of the 3D bounding box 1224. The polygonal base 1222 can represent a road surface underneath the vehicle 112 detected in the video frame. In certain embodiments, the polygonal base 1222 can be shaped substantially as a parallelogram or another type of quadrilateral.

In some embodiments, the 3D bounding box 1224 can be calculated from the vehicle bounding box 800 generated by the first convolutional neural network 314. In these embodiments, the 3D bounding box 1224 can be calculated by first estimating the vehicle's size and orientation using certain regression techniques and/or using a convolutional neural network and then constraining and bounding the vehicle using projective geometry. In certain embodiment, the 3D bounding box 1224 can be obtained by passing the video frame to a deep learning model trained to bound objects (e.g., vehicles) in 3D bounding boxes.

The method can further comprise masking the LOI polygon 1012 such that the entire area within the LOI polygon 1012 is filled with pixels. For example, the pixels used to fill the area encompassed by the LOI polygon 1012 can be pixels of a certain color or intensity.

The method can also comprise determining the pixel intensity value associated with each pixel within the polygonal base 1222. The pixel intensity value can represent a degree of overlap between the LOI polygon 1012 and the polygonal base 1222. The method can further comprise calculating a lane occupancy score by taking an average of the pixel intensity values of all pixels within the polygonal base 1222. A potential traffic violation can then be detected if the lane occupancy score exceeds a predetermined threshold value.

In an alternative embodiment, a deep learning model (or another head of the second convolutional neural network 315) can be trained to recognize vehicle tires (such as the tires 1204 shown in FIGS. 12A and 12B). Once the tires of a vehicle are recognized or detected, the pixel location of the tires can be compared with the coordinates of the LOI polygon 1012 to determine whether the vehicle is occupying the lane bounded by the LOI polygon 1012. For example, a heuristic can be used that as long as the pixel location of at least two tires (e.g., the two back tires) of the vehicle is determined to be within the LOI polygon 1012, the vehicle can be considered to be within the lane bounded by the LOI polygon 1012.

In yet another embodiment, the event detection engine 300 can use one or more geometric computer vision algorithms to construct a three-dimensional (3D) model of the vehicle and the lanes captured in the video frame. The 3D model can be used to more accurately determine a potential traffic violation or to corroborate results determined using lane occupancy scores.

Figure 13:
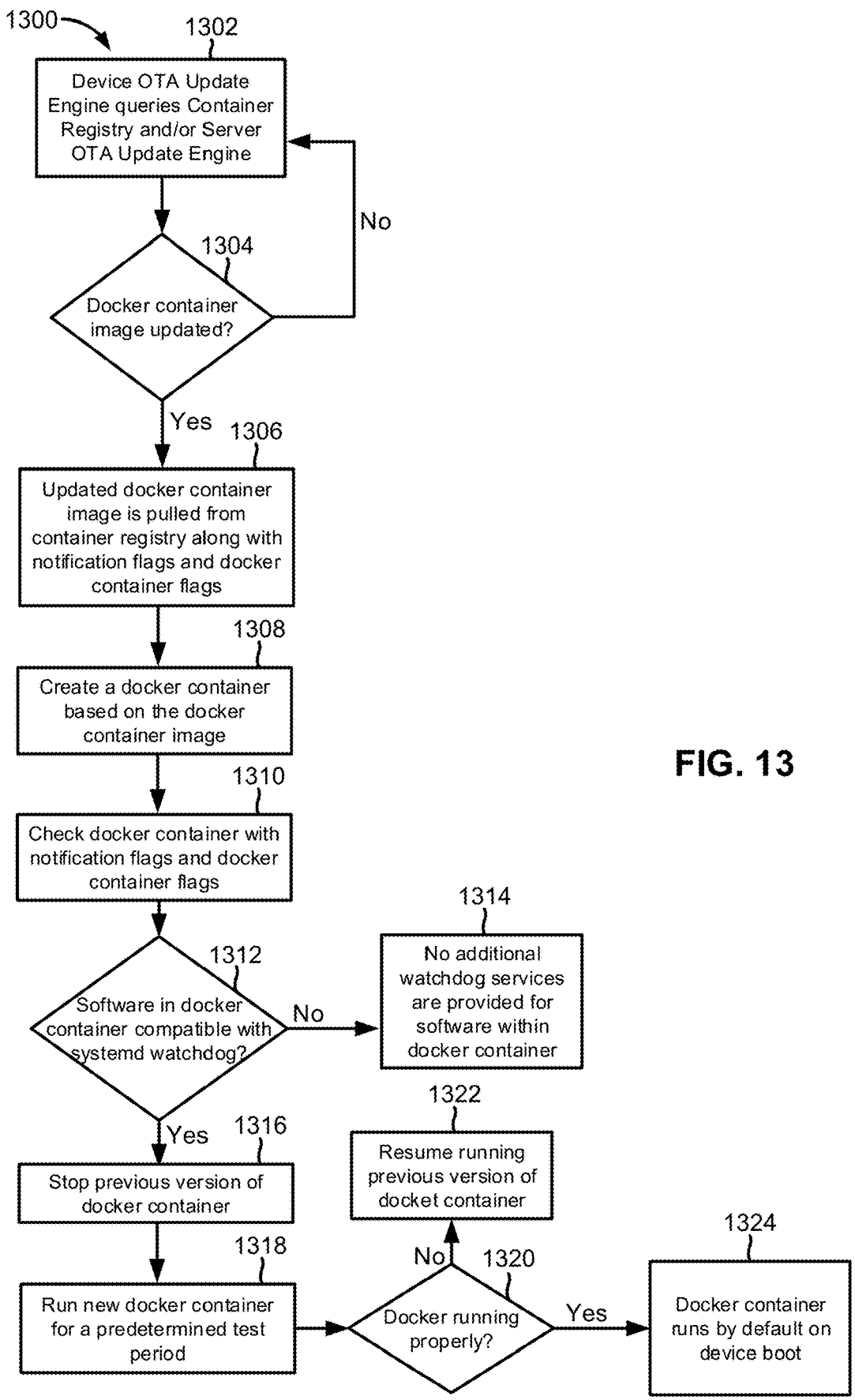
FIG. 13 is a flowchart illustrating one embodiment of a method of providing updates to the edge device.

FIG. 13 is a flowchart illustrating a method 1300 of providing software and/or data updates to the edge devices 102. The updates can be provided wirelessly or over the air.

For example, the updates can be provided over one or more cellular networks, wireless local area networks, or a combination thereof.

One technical problem faced by the applicants is how to securely and efficiently provide software updates and data updates to the edge devices 102 and/or hardware components installed on the edge devices 102. One effective technical solution discovered by the applicants is that software updates and data updates, including updates to the deep learning model 314 and the 3D semantic annotated maps 318, can be securely and efficiently transmitted wirelessly or over the air using docker containers and docker container images 350 (see FIG. 3).

As part of the method 1300, the device over-the-air (OTA) update engine 352 (see FIG. 3) can query a container registry 356 periodically for any updates to software running on the edge device 102 or data or models stored on the edge device 102 in operation 1302. The device OTA update engine 352 can query the container registry 356 by using a docker pull command. In another embodiment, the device OTA update engine 352 can query the server OTA update engine 354 running on the server 104 for any software or data updates.

For example, the device OTA update engine 352 can query at least one of the container registry 356 and the server OTA update engine 354 after a preset time interval. The preset time interval can be adjustable or configurable. For example, the preset time interval can be every 60 seconds. In other example embodiments, the preset time interval can be less than 60 seconds (e.g., every 30 seconds), more than 60 seconds (e.g., every five minutes), hourly (e.g., once every hour), daily (e.g., once every 24 hours), or weekly (e.g., once every seven days). The preset time interval can be adjusted based on the operation or task undertaken by the edge device 102. For example, when the edge device 102 is undertaking a mapping operation such as generating the 3D semantic annotated maps 318, the preset time interval can be every 60 seconds or less. This can allow the edge device 102 to receive updated mapping data and information from all other deployed edge devices 102. However, when the edge device 102 is performing a lane enforcement function such as monitoring for bus lane violations, the preset time interval can be hourly, daily, or weekly.

The software and data updates can be packaged as docker container images 350. For purposes of this disclosure, a docker container image 350 can be defined as a lightweight, standalone, and executable package of software or data that comprises everything needed to run the software or read or manipulate the data including software code, runtime instructions, system tools, system libraries, and system settings. Docker container images 350 can be used to generate or create docker containers on the edge device 102. Docker containers can refer to containerized software or data run or stored on the edge device 102.

The docker containers can be run using a docker engine. In some embodiments, the docker engine can be part of the device OTA update engine 352. In other embodiments, the docker engine can be separate from the device OTA update engine 352. Docker containers can allow software or digital data to be isolated from its environment and provide the same resource isolation and allocation benefits as virtual machines (VMs) but take up less space, handle more applications, and boot up faster.

The docker container images 350 can be managed and distributed by a container registry 356. In some embodiments, the container registry 356 can be provided by a third-party cloud computing provider. For example, the container registry 356 can be the Amazon Elastic Container Registry™. In other embodiments, the container registry 356 can be an application running on the server 104.

In certain embodiments, the docker container images 350 can be stored in a cloud storage node 358 offered by a cloud storage service provider. For example, the docker container images 350 can be stored as objects in an object-based cloud storage environment provided by a cloud storage service provider such as the Amazon™ Simple Storage Service (Amazon S3).

The server OTA update engine 354 can push or upload new software or data updates to the container registry 356 and/or the cloud storage node 358. The server OTA update engine 354 can periodically check for any updates to any device firmware or device drivers from a device manufacturer and package or bundle such updates as docker container images 350 to be pushed or uploaded to the container registry 356 and/or the cloud storage node 358. In some embodiments, a system administrator can use the web portal 332 to upload any software or data updates to the container registry 356 and/or the server 104 via the server OTA update engine 354.

The method 1300 can further comprise determining whether any docker container images (e.g., any docker container images containing updates to the first convolutional neural network 314 or the second convolutional neural network 315) have been updated since the last query in operation 1304. If none of the docker container images have been updated since the last query, the device OTA update engine 352 can once again query the container registry 354 or the server 104 after the preset time interval. If the device OTA update engine 352 determines that one or more of the docker container images 350 have been updated since the last query, the device OTA update engine 352 can pull or download the updated docker container images from the container registry 356 or the cloud storage node 358 along with any accompanying notification flags and docker container flags in operation 1306.

The method 1300 can further comprise creating a docker container based on the new docker container image 350 downloaded in operation 1308. The docker container can be created using standard docker creation protocols. The docker container can also be named according to the version of the docker container.

The method 1300 can also comprise checking the docker container created with one or more notification flags (e.g., NOTIFY flag) and/or docker container flags in operation 1310. The method 1300 can further comprise determining whether a software running in the docker container is compatible with a kernel-level watchdog in operation 1312. For example, the NOTIFY flag can be used to determine if a software running in the docker container is compatible with the systemd watchdog. For Linux/Unix-based systems, systemd is the suite of software that controls what core processes to run when a Linux/Unix system boots up. The watchdog monitors the performance of these core processes (e.g., whether these processes initiated successfully, the amount of memory used, CPU usage, the input/output resources used, etc.) and resets the system if problems are detected.

If the software running in the docker container is determined not to be compatible with the systemd watchdog (e.g., the NOTIFY flag is false), the service that will run the docker container on start is much simpler but no additional watchdog services are provided for the software running within the docker container in operation 1314. If the software running in the docker container is determined to be compatible with the systemd watchdog (e.g., the NOTIFY flag is true), additional flags may be required for the docker container.

The method 1300 can further comprise stopping a previous version of the docker container running on the edge device 102 in operation 1316 and running the new docker container for a predetermined test period in operation 1318. The predetermined test period can be configurable or adjustable. In some embodiments, the predetermined test period can be about 60 seconds. In other embodiments, the predetermined test period can be less than 60 seconds.

The device OTA update engine 352 can determine whether the software within the new docker container is running properly in operation 1320. If the device OTA update engine 352 determines that a service running the new docker container has failed within the predetermined test period, the device OTA update engine 352 can resume running a previous version of the docker container in operation 1322. If the device OTA update engine 352 determines that no service failures are detected within the predetermined test period, the device OTA update engine 352 can change a setup of the edge device 102 so the new docker container runs automatically or by default on device boot in operation 1324. Additional clean-up steps can then be performed such that only the three newest versions of the device container are stored on the edge device 102 and older versions of the device container are deleted.

As a more specific example, the device OTA update engine 352 can receive OTA updates to the first convolutional neural network 314 via a first docker container image and OTA updates to the second convolutional neural network 315 via a second docker container image. The second docker container image can be separate from the first docker container image.

The device OTA update engine 352 can query a container registry for any OTA updates to the first convolutional neural network 314 or the second convolutional neural network 315. The device OTA update engine 352 can download a first docker container image if an update to the first convolutional neural network is detected. The device OTA update engine 352 can also download a second docker container image if an update to the second convolutional neural network is detected.

The device OTA update engine 352 can also create a first docker container based on the first docker container image or create a second docker container based on the second docker container image. The device OTA update engine 352 can then check for a compatibility of an update within the first docker container or the second docker container with a kernel-level watchdog via one or more notification flags.

The device OTA update engine 352 can then run the first docker container or the second docker container for a predetermined test period. The device OTA update engine 352 can resume running a previous version of the first docker container or a previous version of the second docker container if a service failure is detected within the predetermined test period. If no service failures are detected within the predetermined test period, the device OTA update engine 352 can change a setup of the edge device so the first docker container or the second docker container runs automatically on device boot.

In some embodiments, docker containers and docker container images 350 can be used to update an operating system (OS) running on the edge device 102. For example, a docker container image 350 can comprise updates to an application software or firmware along with updates to the OS on which the application software or firmware runs.

In other embodiments, an OS running on the edge device 102 can be updated over the air using an OS package 360 (see FIG. 3) transmitted wirelessly from the server 104, the cloud storage node 358, or another device/server hosting the OS update. For example, a method of updating an OS running on the edge device 102 can comprise receiving an OS package URL and a checksum over the air from the server 104 or the cloud storage node 358.

The OS package URL can be made up of at least a package name and a package version number. The OS package URL can be named according to Debian packaging guidelines (see: https://wiki.debian.org/Packaging). The device OTA update engine 352 can check whether the package version number is newer or different in some manner than a version of the same OS running on the edge device 102. If the device OTA update engine 352 determines that the package version is newer or different in some manner than the version of the same OS running on the edge device 102, the device OTA update engine 352 can download the OS package 360 via the OS package URL. After the OS package 360 is downloaded, the device OTA update engine 352 can compare the checksum to ensure the OS package 360 downloaded successfully. If the checksum is correct or validated, the OS running on the edge device 102 is updated using contents within the OS package 360.

In some embodiments, the OS updated on the edge device 102 can be a Linux-based OS such as the Ubuntu™ OS. In certain embodiments, operating systems running on the edge device 102 can be updated using either OS packages 360 or docker containers and docker container images 350.

In some embodiments, the updates received over-the-air including any OS updates (via OS packages 360), docker container images 350, or a combination thereof can be encrypted with a key that is unique to each edge device 102. Each encrypted update package, including each OS package 360 or docker container image 350, received from the server 104 (or another device) must be decrypted with the same key.

In some embodiments, the key is a hash function of a concatenated string comprising: (i) a serial number of a processor 200 or processing unit/module (e.g., a GPU processing unit) on the edge device 102, (ii) a serial number of a positioning unit 210 (e.g., a GPS unit), and (iii) a special token. In certain embodiments, the serial numbers and the special token can be any alphanumerical string. In these and other embodiments, the hash function can be a nonreversible hash function such as the MD5 hash function. It should be understood by one of ordinary skill in the art and it is contemplated by this disclosure that other has functions can be used as well. For example, the hash function can be any hash function that produces a 128-bit hash value.

Below is a simplified example of a key that can be created: Key=MD5("23467434d001"+"GUID320498857622021"+"secret-key-2021") where "23467434d001" is the serial number of a processor module on the edge device 102, "GUID320498857622021" is the serial number of the GPS unit on the edge device 102, and "secret-key-2021" is the special token. In this example, the key generated can be the following: 79054025255fb1a26e4bc422aef54eb4.

The hash function and the special token can be known only to the edge device 102 and the server 104 or computing resource providing the update. The edge device 102 can decrypt the OTA update package using the key. Encryption and decryption of all OTA update packages is to ensure that the update packages transmitted over the air are not hacked or susceptible to attacks.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method for detecting a potential traffic violation, comprising:
    cropping and resizing one or more video frames of a video captured by one or more video image sensors of an edge device;
    bounding, using one or more processors of the edge device, a vehicle detected from the one or more video frames of the video in a vehicle bounding box, and wherein the vehicle is detected and bounded using a first convolutional neural network;
    bounding, using the one or more processors of the edge device, a plurality of lanes of a roadway detected from the one or more video frames in a plurality of polygons, wherein the plurality of lanes are detected and bounded using multiple heads of a multi-headed second convolutional neural network separate from the first convolutional neural network, and wherein at least one of the polygons is a lane-of-interest (LOI) polygon bounding a LOI;
    translating coordinates in the cropped and resized video frames into new coordinates based on a uniform coordinate domain; and
    detecting, using the one or more processors, a potential traffic violation based in part on an overlap of at least part of the vehicle bounding box and at least part of the LOI polygon.

2. The method of claim 1, wherein detecting the potential traffic violation further comprises:
    discarding an upper portion of the vehicle bounding box such that only a lower portion of the vehicle bounding box remains;
    masking the LOI polygon by filling an area within the LOI polygon with pixels;
    determining a pixel intensity value associated with each pixel within the lower portion of the vehicle bounding box, wherein the pixel intensity value represents a degree of overlap between the LOI polygon and the lower portion of the vehicle bounding box;
    calculating a lane occupancy score by taking an average of the pixel intensity values of all pixels within the lower portion of the vehicle bounding box; and
    detecting the potential traffic violation when the lane occupancy score exceeds a predetermined threshold value.

3. The method of claim 1, wherein detecting the potential traffic violation further comprises:
    determining a length of a baseline segment along a lower side of the vehicle bounding box corresponding to a road segment under a rear end of the vehicle;
    masking the LOI polygon by filling an area within the LOI polygon with pixels;
    determining a pixel intensity value associated with each pixel along the baseline segment, wherein the pixel intensity value represents a degree of overlap between the LOI polygon and the baseline segment;
    calculating a lane occupancy score by taking an average of the pixel intensity values of all pixels along the baseline segment; and
    detecting the potential traffic violation when the lane occupancy score exceeds a predetermined threshold value.

4. The method of claim 1, wherein detecting the potential traffic violation further comprises:
    generating a three-dimensional (3D) bounding box based on the vehicle bounding box, wherein the vehicle bounding box is a two-dimensional (2D) bounding box, and wherein the 3D bounding box comprises a polygonal base representing a road surface underneath the vehicle;
    masking the LOI polygon by filling an area within the LOI polygon with pixels;
    determining a pixel intensity value associated with each pixel within the polygonal base, wherein the pixel intensity value represents a degree of overlap between the LOI polygon and the polygonal base;
    calculating a lane occupancy score by taking an average of the pixel intensity values of all pixels within the polygonal base; and
    detecting the potential traffic violation when the lane occupancy score exceeds a predetermined threshold value.

5. The method of claim 1, wherein the first convolutional neural network is run by a first worker of an event detection engine on the edge device, wherein the second convolutional neural network is run by a second worker of the event detection engine, and wherein the method further comprises:
    transmitting outputs from the first convolutional neural network comprising data or information concerning the vehicle bounding box from the first worker to a third worker of the event detection engine using an inter-process communication protocol;
    transmitting outputs from the second convolutional neural network comprising data or information concerning the plurality of polygons and the LOI polygon from the second worker to the third worker using the inter-process communication protocol; and
    detecting the potential traffic violation using the third worker based on data and information received via the inter-process communication protocol from the first worker and the second worker.

6. The method of claim 1, further comprising determining whether a vanishing point is present within the one or more video frames and adjusting at least one of the one or more video image sensors of the edge device or a cropping parameter used to crop the one or more video frames if the vanishing point is not detected.

7. The method of claim 1, further comprising applying a noise smoothing operation to the one or more video frames comprising the plurality of lanes prior to bounding the plurality of lanes using the polygons.

8. The method of claim 1, further comprising:
    receiving, at the edge device, over-the-air (OTA) updates to the first convolutional neural network via a first docker container image; and
    receiving, at the edge device, OTA updates to the second convolutional neural network via a second docker container image, wherein the second docker container image is separate from the first docker container image.

9. The method of claim 8, wherein receiving the OTA updates further comprises:

querying a container registry for any updates to the first convolutional neural network or the second convolutional neural network;

downloading the first docker container image if an update to the first convolutional neural network is detected and downloading the second docker container image if an update to the second convolutional neural network is detected;

creating a first docker container based on the first docker container image or creating a second docker container based on the second docker container image;

checking for a compatibility of an update within the first docker container or the second docker container with a kernel-level watchdog via one or more notification flags;

running the first docker container or the second docker container for a predetermined test period; and resume running a previous version of the first docker container or the second docker container if a service failure is detected within the predetermined test period or changing a setup of the edge device so the first docker container or the second docker container runs automatically on device boot if no service failures are detected within the predetermined test period.

10. The method of claim 1, further comprising:
receiving, at the edge device, over-the-air (OTA) updates to an operating system (OS) run on the edge device, wherein receiving the OTA updates comprises receiving an OS package URL and a checksum, wherein the OS package URL is made up of at least a package name and a package version number;

downloading an OS package via the OS package URL when the package version number is different from a version number of an OS running on the edge device;

comparing the checksum to ensure the OS package is downloaded successfully; and updating the OS running on the edge device using contents within the OS package downloaded.

11. The method of claim 8, wherein receiving the OTA updates further comprises decrypting the OTA updates received using a key, wherein the key is a hash function of a string concatenated from a serial number of a processor or processing unit of the edge device, a serial number of a positioning unit of the edge device, and an alphanumeric token, and wherein the key is unique to the edge device.

12. The method of claim 1, wherein the edge device is coupled to a carrier vehicle and wherein the video is captured using the one or more video image sensors of the edge device while the carrier vehicle is in motion.

13. A device for detecting a potential traffic violation, comprising:
one or more video image sensors configured to capture a video of a vehicle and a plurality of lanes of a roadway; and one or more processors programmed to execute instructions to:
crop and resize one or more video frames of the video;
bound the vehicle detected from the one or more video frames of the video in a vehicle bounding box, wherein the vehicle is detected and bounded using a first convolutional neural network;
bound a plurality of lanes of a roadway detected from the one or more video frames in a plurality of polygons, wherein the plurality of lanes are detected and bounded using multiple heads of a multi-headed second convolutional neural network separate from the first convolutional neural network, and wherein at least one of the polygons is a lane-of-interest (LOI) polygon bounding a LOI;
translate coordinates in the cropped and resized video frames into new coordinates based on a uniform coordinate domain; and
detect that a potential traffic violation has occurred based in part on an overlap of at least part of the vehicle bounding box and at least part of the LOI polygon.

14. The device of claim 13, wherein the one or more processors are programmed to execute instructions to:
discard an upper portion of the vehicle bounding box such that only a lower portion of the vehicle bounding box remains;
mask the LOI polygon by filling an area within the LOI polygon with pixels;
determine a pixel intensity value associated with each pixel within the lower portion of the vehicle bounding box, wherein the pixel intensity value represents a degree of overlap between the LOI polygon and the lower portion of the vehicle bounding box;
calculate a lane occupancy score by taking an average of the pixel intensity values of all pixels within the lower portion of the vehicle bounding box; and
detect that a potential traffic violation has occurred when the lane occupancy score exceeds a predetermined threshold value.

15. The device of claim 13, wherein the one or more processors are programmed to execute instructions to:
determine a length of a baseline segment along a lower side of the vehicle bounding box corresponding to a road segment under a rear end of the vehicle;
mask the LOI polygon by filling an area within the LOI polygon with pixels;
determine a pixel intensity value associated with each pixel along the baseline segment, wherein the pixel intensity value represents a degree of overlap between the LOI polygon and the baseline segment;
calculate a lane occupancy score by taking an average of the pixel intensity values of all pixels along the baseline segment; and
detect that a potential traffic violation has occurred when the lane occupancy score exceeds a predetermined threshold value.

16. The device of claim 13, wherein the one or more processors are programmed to execute instructions to:
generate a three-dimensional (3D) bounding box based on the vehicle bounding box, wherein the vehicle bounding box is a two-dimensional (2D) bounding box, and wherein the 3D bounding box comprises a polygonal base representing a road surface underneath the vehicle;
mask the LOI polygon by filling an area within the LOI polygon with pixels;
determine a pixel intensity value associated with each pixel within the polygonal base, wherein the pixel intensity value represents a degree of overlap between the LOI polygon and the polygonal base;
calculate a lane occupancy score by taking an average of the pixel intensity values of all pixels within the polygonal base; and
detect that a potential traffic violation has occurred when the lane occupancy score exceeds a predetermined threshold value.

17. The device of claim 13, wherein the first convolutional neural network is run by a first worker of an event detection engine on the device, wherein the second convolutional neural network is run by a second worker of the event detection engine, and wherein the one or more processors are programmed to execute instructions to:

transmit outputs from the first convolutional neural network comprising data or information concerning the vehicle bounding box from the first worker to a third worker of the event detection engine using an inter-process communication protocol;

transmit outputs from the second convolutional neural network comprising data or information concerning the plurality of polygons and the LOI polygon from the second worker to the third worker using the inter-process communication protocol; and detect the potential traffic violation using the third worker based on data and information received via the inter-process communication protocol from the first worker and the second worker.

18. The device of claim 13, wherein the one or more processors are programmed to execute instructions to:

receive, at the device, over-the-air (OTA) updates to the first convolutional neural network via a first docker container image; and receive, at the edge device, OTA updates to the second convolutional neural network via a second docker container image, wherein the second docker container image is separate from the first docker container image.

19. The device of claim 18, wherein the one or more processors are programmed to execute instructions to decrypt the OTA updates received using a key, wherein the key is a hash function of a string concatenated from a serial number of a processor or processing unit of the edge device, a serial number of a positioning unit of the edge device, and an alphanumeric token, and wherein the key is unique to the edge device.

20. A non-transitory computer-readable medium comprising machine-executable instructions stored thereon, wherein the instructions comprise the steps of:

cropping and resizing one or more video frames of a video captured by one or more video image sensors of an edge device;

bounding a vehicle detected from the one or more video frames of the video in a vehicle bounding box, and wherein the vehicle is detected and bounded using a first convolutional neural network;

bounding a plurality of lanes of a roadway detected from the one or more video frames in a plurality of polygons, wherein the plurality of lanes are detected and bounded using multiple heads of a multi-headed second convolutional neural network separate from the first convolutional neural network, and wherein at least one of the polygons is a lane-of-interest (LOI) polygon bounding a LOI;

translating coordinates in the cropped and resized video frames into new coordinates based on a uniform coordinate domain; and detecting a potential traffic violation based in part on an overlap of at least part of the vehicle bounding box and at least part of the LOI polygon.

21. The non-transitory computer-readable medium of claim 20, wherein the instructions further comprise the steps of:

discarding an upper portion of the vehicle bounding box such that only a lower portion of the vehicle bounding box remains;

masking the LOI polygon by filling an area within the LOI polygon with pixels;

determining a pixel intensity value associated with each pixel within the lower portion of the vehicle bounding box, wherein the pixel intensity value represents a degree of overlap between the LOI polygon and the lower portion of the vehicle bounding box;

calculating a lane occupancy score by taking an average of the pixel intensity values of all pixels within the lower portion of the vehicle bounding box; and detecting the potential traffic violation when the lane occupancy score exceeds a predetermined threshold value.

22. The non-transitory computer-readable medium of claim 20, wherein the instructions further comprise the steps of:

determining a length of a baseline segment along a lower side of the vehicle bounding box corresponding to a road segment under a rear end of the vehicle;

masking the LOI polygon by filling an area within the LOI polygon with pixels;

determining a pixel intensity value associated with each pixel along the baseline segment, wherein the pixel intensity value represents a degree of overlap between the LOI polygon and the baseline segment;

calculating a lane occupancy score by taking an average of the pixel intensity values of all pixels along the baseline segment; and detecting the potential traffic violation when the lane occupancy score exceeds a predetermined threshold value.

23. The non-transitory computer-readable medium of claim 20, wherein the instructions further comprise the steps of:

generating a three-dimensional (3D) bounding box based on the vehicle bounding box, wherein the vehicle bounding box is a two-dimensional (2D) bounding box, and wherein the 3D bounding box comprises a polygonal base representing a road surface underneath the vehicle;

masking the LOI polygon by filling an area within the LOI polygon with pixels;

determining a pixel intensity value associated with each pixel within the polygonal base, wherein the pixel intensity value represents a degree of overlap between the LOI polygon and the polygonal base;

calculating a lane occupancy score by taking an average of the pixel intensity values of all pixels within the polygonal base; and detecting the potential traffic violation when the lane occupancy score exceeds a predetermined threshold value.

24. The non-transitory computer-readable medium of claim 20, wherein the instructions further comprise the steps of:

transmitting outputs from the first convolutional neural network comprising data or information concerning the vehicle bounding box from a first worker to a third worker of the event detection engine using an inter-process communication protocol, wherein the first convolutional neural network is run by the first worker of an event detection engine;

transmitting outputs from the second convolutional neural network comprising data or information concerning the plurality of polygons and the LOI polygon from a second worker to the third worker using the inter-process communication protocol, wherein the second convolutional neural network is run by the second worker of the event detection engine; and detecting the potential traffic violation using the third worker based on data and information received via the inter-process communication protocol from the first worker and the second worker.

25. The non-transitory computer-readable medium of claim 20, wherein the instructions further comprise the steps of:
receiving, at the edge device, over-the-air (OTA) updates to the first convolutional neural network via a first docker container image; and
receiving, at the edge device, OTA updates to the second convolutional neural network via a second docker container image, wherein the second docker container image is separate from the first docker container image.

26. The non-transitory computer-readable medium of claim 25, wherein the instructions further comprise the step of decrypting the OTA updates received using a key, wherein the key is a hash function of a string concatenated from a serial number of a processor or processing unit of the edge device, a serial number of a positioning unit of the edge device, and an alphanumeric token, and wherein the key is unique to the edge device.

\* \* \* \* \*